(12) United States Patent
Blake et al.

(10) Patent No.: US 7,653,261 B2
(45) Date of Patent: Jan. 26, 2010

(54) IMAGE TAPESTRY

(75) Inventors: Andrew Blake, Stapleford (GB);
Carsten Curt Eckard Rother,
Cambridge (GB); Sanjiv Kumar,
Pittsburgh, PA (US); **Vladimir
Kolmogorov**, Ipswich (GB)

(73) Assignee: Microsoft Corporation, Redmond, WA (US)

( * ) Notice: Subject to any disclaimer, the term of this patent is extended or adjusted under 35 U.S.C. 154(b) by 726 days.

(21) Appl. No.: 11/213,080

(22) Filed: Aug. 26, 2005

(65) Prior Publication Data

US 2006/0104542 A1 May 18, 2006

Related U.S. Application Data

(60) Provisional application No. 60/627,384, filed on Nov. 12, 2004.

(51) Int. Cl.
*G06K 9/36* (2006.01)

(52) U.S. Cl. .................. 382/284; 382/305; 358/452; 358/453

(58) Field of Classification Search ............ 382/284, 382/294, 305; 358/540, 450, 453
See application file for complete search history.

(56) References Cited

U.S. PATENT DOCUMENTS

| | | | |
|---|---|---|---|
| 5,442,462 A * | 8/1995 | Guissin | 358/463 |
| 5,568,194 A | 10/1996 | Abe | |
| 5,850,352 A | 12/1998 | Moezzi et al. | |
| 5,862,508 A | 1/1999 | Nagaya et al. | |
| 5,963,247 A | 10/1999 | Banitt | |
| 6,123,362 A | 9/2000 | Squilla et al. | |
| 6,205,259 B1 | 3/2001 | Komiya et al. | |
| 6,263,088 B1 | 7/2001 | Crabtree et al. | |
| 6,320,976 B1 | 11/2001 | Murthy et al. | |
| 6,324,441 B1 * | 11/2001 | Yamada | 700/138 |
| 6,331,860 B1 * | 12/2001 | Knox | 345/620 |
| 6,392,658 B1 | 5/2002 | Oura | |
| 6,396,963 B2 | 5/2002 | Shaffer et al. | |
| 6,411,742 B1 | 6/2002 | Peterson | |

(Continued)

FOREIGN PATENT DOCUMENTS

JP 2000043363 2/2000

(Continued)

OTHER PUBLICATIONS

Agarwala, A et al. "Interactive Digital Photomontage", ACM Trans Graph. 23, 3, (2004), pp. 1-9.

(Continued)

*Primary Examiner*—Yosef Kassa

(57) ABSTRACT

An output image formed from at least a portion of one or more input images may be automatically synthesized as a tapestry image. To determine which portion or region of each input image will be used in the image tapestry, the regions of each image may be labeled by one of a plurality of labels. The multi-class labeling problem of creating the tapestry may be resolved such that each region in the tapestry is constructed from one or more salient input image regions that are selected and placed such that neighboring blocks in the tapestry satisfy spatial compatibility. This solution may be formulated using a Markov Random Field and the resulting tapestry energy function may be optimized in any suitable manner. To optimize the tapestry energy function, an expansion move algorithm for energy functions may be generated to apply to non-metric hard and/or soft constraints.

22 Claims, 29 Drawing Sheets

U.S. PATENT DOCUMENTS

| | | |
|---|---|---|
| 6,663,732 B1 | 12/2003 | Link |
| 6,669,346 B2 * | 12/2003 | Metcalf ........................ 353/94 |
| 6,686,955 B1 * | 2/2004 | Fields et al. ............. 348/218.1 |
| 6,717,608 B1 | 4/2004 | Mancuso et al. |
| 6,750,974 B2 * | 6/2004 | Svetkoff et al. ............. 356/602 |
| 6,798,903 B2 | 9/2004 | Takaoka |
| 6,850,252 B1 | 2/2005 | Hoffberg |
| 6,919,892 B1 | 7/2005 | Cheiky et al. |
| 6,999,095 B2 | 2/2006 | Wang et al. |
| 7,021,825 B1 * | 4/2006 | Schultz ........................ 383/76 |
| 7,027,054 B1 | 4/2006 | Cheiky et al. |
| 7,057,650 B1 | 6/2006 | Sakamoto |
| 7,058,252 B2 | 6/2006 | Woodgate et al. |
| 7,085,435 B2 | 8/2006 | Takiguchi et al. |
| 7,096,426 B1 | 8/2006 | Lin-Hendel |
| 7,098,914 B1 | 8/2006 | Katayama et al. |
| 7,181,017 B1 | 2/2007 | Nagel et al. |
| 7,308,133 B2 | 12/2007 | Gutta et al. |
| 7,529,429 B2 | 5/2009 | Rother et al. |
| 7,532,771 B2 | 5/2009 | Taylor et al. |
| 2003/0095720 A1 | 5/2003 | Chiu et al. |
| 2004/0161224 A1 | 8/2004 | Yamazoe et al. |
| 2005/0016244 A1 | 1/2005 | Hergemoller |
| 2005/0044485 A1 | 2/2005 | Mondry et al. |
| 2005/0062841 A1 | 3/2005 | Rivera-Cintron |
| 2006/0061598 A1 | 3/2006 | Mino et al. |
| 2006/0062455 A1 | 3/2006 | Chiu et al. |
| 2006/0062456 A1 | 3/2006 | Chiu et al. |
| 2006/0104542 A1 | 5/2006 | Blake et al. |
| 2006/0140455 A1 | 6/2006 | Costache et al. |

FOREIGN PATENT DOCUMENTS

| | | |
|---|---|---|
| WO | WO2006/079991 | 8/2005 |
| WO | WO2008/073998 | 6/2008 |

OTHER PUBLICATIONS

Chen, J-Y, "Hierarchical Browsing and Search of Large Image Databases", IEEE Transactions on Image Processing, vol. 9, No. 3, (Mar. 2000), pp. 1-15.

Diakopoulos, N. et al., "Mediating Photo Collage Authoring", (Oct. 2005), pp. 183-186.

Efros, A. A. et al. "Image Quilting for Texture Synthesis and Transfer". Proc. ACM Siggraph, (2001), pp. 341-346.

Gemmell, J et al. "My LifeBits: Fulfilling the Memex Vision", Proceedings ACM Multimedia 2002, 10th International Conference on Multimedia, Juan-les-Pins, France, Dec. 1-6, 2002 ACM International Multimedia Conference New York: AMC, US, vol. conf 10, (Dec. 2002), pp. 1-4.

Gemmell, J et al. "Telling Stories with Mylifebits", Multimedia and Expo 2005, ICME 2005, IEEE International Conference on Amsterdam, The Netherlands (Jul. 2005), pp. 1-4.

iView MediaPro User Manual, iView Multimedia Ltd, London, GB, (Jul. 2002), pp. 1-58.

Krishnamachari, S. "Image Browsing using Hierarchical Clustering", Computers and Communications, 1999. Proceedings IEEE International Symposium on Red Sea, Egypt Jul. 6-8, 1999, Los Alamitos, CA, USA, IEEE Comput. Soc. USA, Jul. 6, 1999, pp. 301-307.

Kwatra, V. et al. "Graphcut Textures: Images and Video Synthesis Using Graph Cuts". ACM Trans Graph. 22, 3, 227-286, (2003), pp. 1-10.

Ma, Y et al. "Video Snapshot: A Bird View of Video Sequence", Multimedia Modelling Conference, 2004, MMM 2005, Proceedings of the 11th International Honolulu, HI, USA, Jan. 12-14, 2005, Piscataway, NJ, USA, IEEE Jan. 12, 2005, pp. 1-8.

Parker, E. "Virtual Reality". WESCON/96 Anaheim, CA, USA, Oct. 22-24, 1996, New York, NY, USA, IEEE, US Oct. 22, 1996, pp. 542-546.

Perez, P. et al. "Poisson Image Editing". ACM Trans. Graph. 22, 3, 313-318, (2003).

Rother, Carsten et al., "Digital Tapestry", retrieved on Dec. 12, 2006, <<http://research.microsoft.com/about.carrot/ publicatons.sub.--files/papersub.--DigitalTapestry.sub.--CVPRO5.pdf>>, 8 pages.

Wang, J. et al. "Picture Collage", Proceedings of the 2006 IEEE Computer Society Conference on Computer Vision and Pattern Recognition, pp. 1-8.

Boykov, et al., "Fast Approximate Energy Minimization via Graph Cuts", IEEE Transactions on Pattern Analysis and Machine Intelligence, v.23 n. 11, p. 1222-1239, Nov. 2001.

Carson, et al., "Blobworld: Image Segmentation Using Expectation-Maximization and Its Application to Image Querying", IEEE Transactions on Pattern Analysis and Machine Intelligence, v.24 n. 8, p. 1026-1038, Aug. 2002.

Fitzgibbon, et al., "On Affine Invariant Clustering and Automatic Cast Listing in Movies", Proceedings of the 7th European Conference on Computer Vision-Part III, p. 304-320, May 28-31, 2002.

Jojic, et al., "Epitomic Analysis of Appearance and Shape", at <<http://www.research.microsoft.com/about.jojic>>, ICCV, 2003.

Kolmogorov, et al., "Computing Visual Correspondence with Occlusions using Graphs Cuts", Computer Science Department Cornell University, In International Conference on Computer Vision, 2001.

Kolmogorov, et al., "Multi-camera Scene Reconstruction via Graph Cuts", Computer Science Department Cornell University, Proceedings of the 7th European Conference on Computer Vision-Part III, 2002.

Kolmogorov, et al., "What Energy Functions can be Minimized via Graph Cuts?", Computer Science Department Cornell University, In European Conference on Computer Vision, 2002.

Rother, et al., "AutoCollage", ACM Siggraph 2006 Papers, Jul. 30-Aug. 3, 2006, Boston, Massachusetts.

Swain, et al., "Color Indexing", Kluwer Academic Publishers, International Journal of Computer Vision, v.7 n. 1, p. 11-32, Nov. 1991.

Uyttendaele, et al., "Eliminating Ghosting and Exposure Artifacts in Image Mosaics", IEE Computer Society, Dec. 2001.

Viola, et al., "Rapid Object Detection Using a Boosted Cascade of Simple Features", CVPR, 2001.

Zhu, et al., "Filters, Random Field and Maximum Entropy (Frame): Towards a Unified Theory for Texture Modeling", Kluwer Academic Publishers, 1998, pp. 107-126.

\* cited by examiner

400

500

1700

1800

2802  2804  2806  2808

2902  2904  2906  2908

IMAGE TAPESTRY

CROSS-REFERENCE TO RELATED APPLICATION

This application claims the benefit of U.S. Provisional Patent Application Ser. No. 60/627,384, filed Nov. 12, 2004, which is incorporated herein by reference.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An output image formed from at least a portion of one or more input images may be automatically synthesized as a tapestry image. The tapestry can be viewed as a visual summary or a virtual 'thumbnail' of a plurality of the images in the input collection or a summary of portions of a single image. To determine which portion or region of each input image will be used in the image tapestry, the regions of each image may be labeled by one of a plurality of labels. The multi-class labeling problem of creating the tapestry may be resolved such that each region in the tapestry is constructed from one or more salient input image regions that are selected and placed such that neighboring blocks in the tapestry satisfy spatial compatibility. This solution may be formulated using a Markov Random Field and optimized. The resulting tapestry energy function from the Markov Random Field may be optimized in any suitable manner. Typical standard expansion move algorithms can only handle energies with metric terms, while the tapestry energy discussed further below may contain non-metric (soft and hard) constraints. To generate an image tapestry comprising image portions from a plurality of input image regions, the expansion move algorithm for energy functions with non-metric hard and soft constraints may be generated.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image tapestry system, the system described is provided as an example and not a limitation. As those skilled in the art will appreciate, the present examples are suitable for application in a variety of different types of selection and/or labeling systems.

Exemplary Operating Environment

Figure 1:
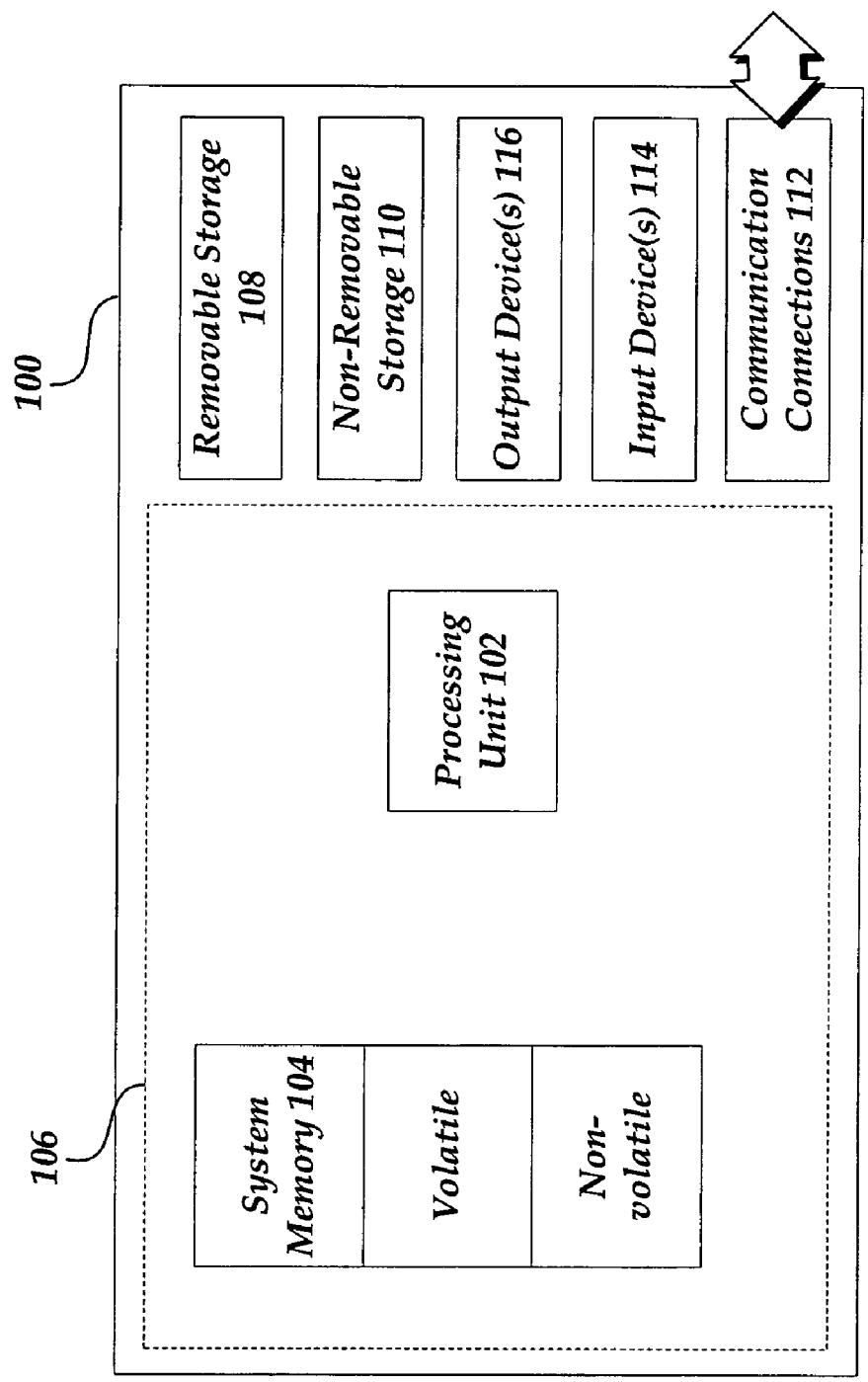
FIG. 1 is an example schematic diagram of an example computer system for implementing digital image tapestry.

FIG. 1 and the following discussion are intended to provide a brief, general description of a suitable computing environment in which an image tapestry system may be implemented. The operating environment of FIG. 1 is only one example of a suitable operating environment and is not intended to suggest any limitation as to the scope of use or functionality of the operating environment. Other well known computing systems, environments, and/or configurations that may be suitable for use with an image tapestry system described herein include, but are not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

Although not required, the image tapestry system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

With reference to FIG. 1, an example system for implementing the image tapestry system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain one or more communication connections 112 that allow the device 100 to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes both storage media and communication media.

Device 100 may also have one or more input device(s) 114 such as keyboard, mouse, pen, voice input device, touch input device, digital video camera, and/or any other input device. Output device(s) 116 such as display, speakers, printer, and/or any other output device may also be included.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

To create a digital tapestry, at least a portion of one or more input images may be selected and located to form a single photomontage. The digital tapestry may remind the user of the photo collection, e.g., a 'thumbnail' of the image collection. In some cases, the tapestry may act as an image retrieval system. For example, a user may select one or more portions of the tapestry, and the tapestry system may retrieve one or more images having similar image characteristics, may retrieve the input image(s) providing the depicted image in the selected region, and the like.

For example, in the prior art, a manually generated image tapestry may be formed by manually segmenting and combining a collection of digital images. For example, the collection 200 of consumer photographs 202, 204, 206, 208, 210, 212, 214, 216 in FIG. 2, may be manually cropped and combined to form the manually generated tapestry 300 illustrated in FIG. 3, such as by using ADOBE PHOTOSHOP® commercial image editing software available from Adobe Systems Inc., of San Jose, Calif.

Figure 4:
FIG. 4 is an example naïve mosaic image of representative images of the input images of FIG. 2.

A naive version of a tapestry may be generated by selecting a subset of images from the input collection based on some global image properties, e.g. color, and then creating a mosaic using this subset. FIG. 4 shows an example mosaic 400 using a subset of four images (202, 206, 212, 216) of the input collection. The example mosaic of FIG. 4 uses the entire input image as a selected and displayed image region within the mosaic, which may preserve the shape and appearance of the selected image regions. However, in addition to not being visually appealing, the main drawback of such a mosaic is that it comprises information from a limited number of images, where several regions are potentially uninformative (grass in the case of FIG. 5). In a tapestry, one would like to include as many salient regions from different images in the collection as possible.

Another possible choice is to synthesize a tapestry through texture synthesis. However, the traditional texture synthesis techniques, both parametric as well as non-parametric, address the problem of synthesizing a large texture image given a small sample. Moreover, the input image(s) of a tapestry may contain one or more image characteristics, such as texture and/or depicted objects.

Figure 5:
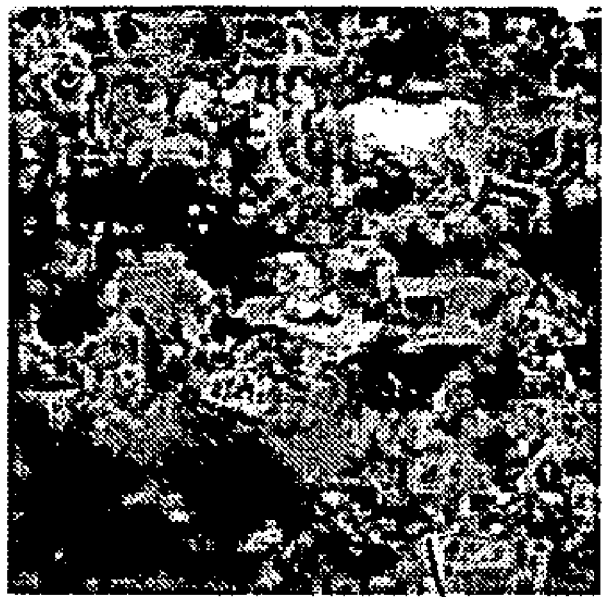
FIG. 5 is an example prior art epitome image of the input images of FIG. 2.

A generative framework to obtain a condensed version of the input image may be called an epitome. An epitome may contain and/or preserve the essence of the shape and appearance of the original image. Epitome images are discussed further in Jojic et al., "Epitomic analysis of appearance and shape," ICCV, Nice, France, 2003, pp. 34-41. FIG. 5 shows an example prior art epitome 500 for the mosaic 400 of images in FIG. 4. To remove artificial seams, the epitome 500 of FIG. 5 was initialized with the input image 206 of FIG. 2. Typically the epitome does not work well if the input image contains many different texture types, like a mosaic of different images.

The epitome framework may be extended to create a photomontage from different images. However, typically, epitome models for several images work well only if those images contain similar objects (e.g., different images of the same scene). In contrast, the collection from which a tapestry may be created may have many different images. As illustrated by the epitome 500, the structure of the objects displayed in the individual input images of the mosaic 400 of FIG. 4 is not preserved in the epitome 500. The epitome is formed by selecting input image portions for the epitome such that the epitome may be used to regenerate (e.g., 'reverse engineer') the original image again using a smooth map which may be learned in the epitome framework. However, it is to be appreciated that in the tapestry framework, an input image region may be selected and/or placed in the tapestry free of the need to regenerate the input image from the tapestry. In this manner, saliency of the input image regions may be directed by user defined factors rather than by the need to preserve regeneration of the input image(s).

In the prior art domain of user-assisted techniques, a system called digital photomontage has been proposed which combines parts of a set of photographs into a single composite picture. Digital photomontages are described further in Agrawala et al., "Interactive Digital Photomontage," ACM Transactions on Graphics Vol. 23, no. 3, SIGGRAPH 2004, pp. 294-295, which is incorporated herein by reference. Generally, in a photomontage, the input set of images are assumed to be of the same scene and roughly registered, e.g., several images from the same camera viewpoint. In this manner, the registered portions of multiple images may be 'stitched together' to form a large composite picture. In contrast, in an image tapestry, the images from a collection may contain very different scenes and registration may be infeasible. Combining parts from different images in digital photomontage typically requires the user to select which image parts to display and requires the user to select where to place them.

To resolve the problems of the prior art, an image tapestry system may be used to create a tapestry automatically from a large number of input images. One or more input image(s) of a tapestry may be unregistered and/or may contain image characteristics (e.g., color, texture, contrast, depicted objects, viewpoints, and the like) which are different from other input images to the tapestry.

Figure 6:
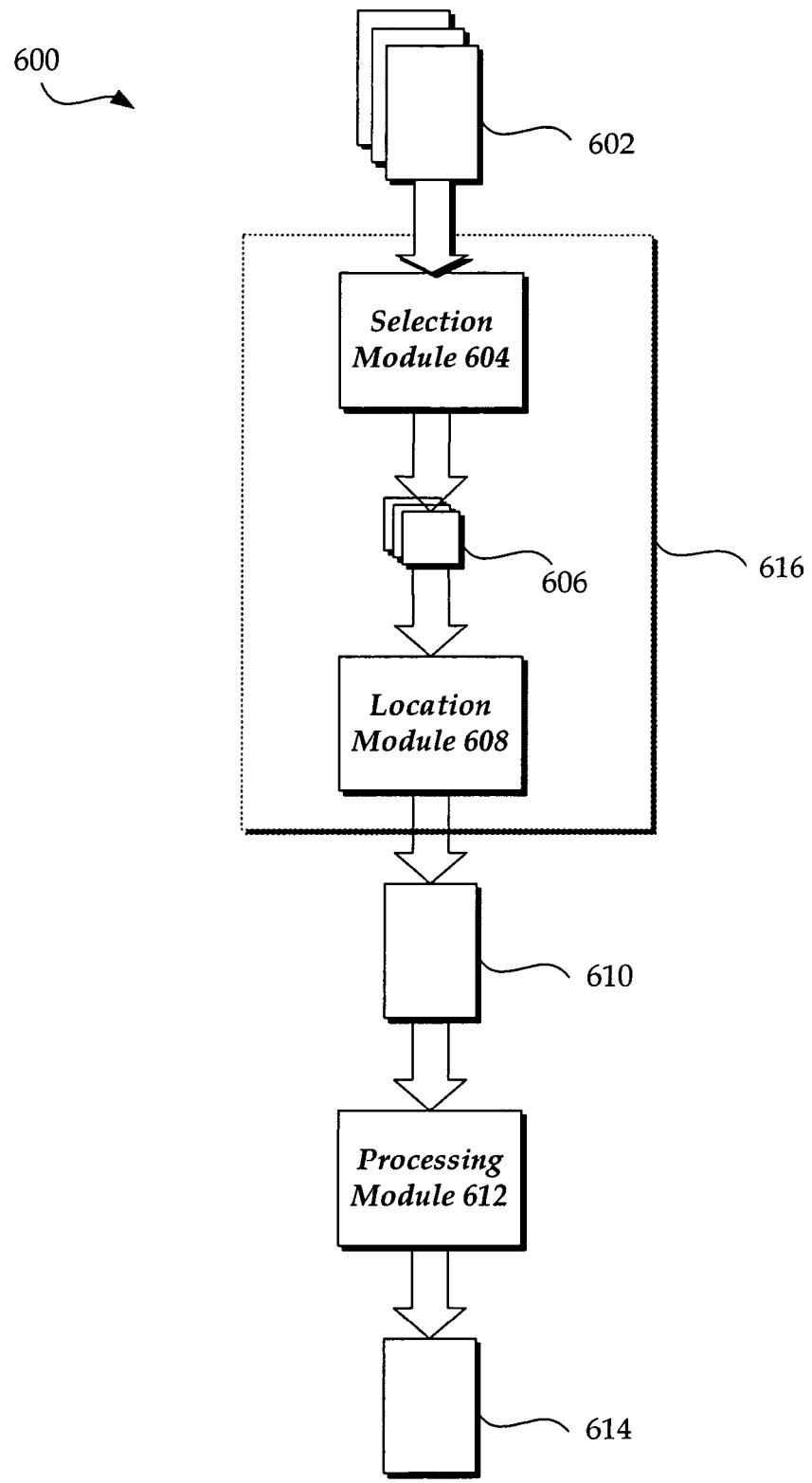
FIG. 6 is a data flow diagram of an example image tapestry system.

An image tapestry may contain a plurality of visually informative regions, the tapestry image regions being selected from a one or more input images. FIG. 6 illustrates an example data flow diagram 600 of forming an image tapestry from one or more input images. Thus, a plurality of input images 602 may be input to a selection module 604. The input images may be selected in any suitable manner. For example the user may designate or select one or more input images for the tapestry, images in a selected folder may be used to form the tapestry, images taken within a predetermined or selected period of time and/or date may be used to form the tapestry, images loaded to a data store at a predetermined (e.g., single time) or user selected time frame may be used to form the tapestry, and the like.

The selection module 604 may select zero or more regions from each input image, forming a set 606 of two or more selected regions. In one example, an image tapestry may contain a region from as many different input images as possible from the input collection. In another example, the set of image regions may contain two regions from different portions of a single input image. In another example, a region is of the size of an image pixel. In another example, a region is an irregular connected set of pixels. It is to be appreciated that the set of two or more image regions of the tapestry may be selected from any number of input images. Image regions for the tapestry may be selected from the one or more input images in any suitable manner. For example, the saliency of a region of an input image may be determined based on one or more factors, such as contrast, face and/or object detection, region uniqueness, neighboring selected image regions, redundancy of selected image regions, representation of main texture types from different input images, and the like.

Two or more of the selected regions may be placed in the image tapestry by a location module 608. For example, the location module may place the regions in any suitable manner. For example, the regions may be placed realistically, e.g., sky at the top, grass at the bottom, and the like. Additionally or alternatively, the location module may place neighboring regions in an input image as neighboring regions in the tapestry image, may control image shift from between the input image and the resulting tapestry, and the like. However, it is to be appreciated that the resulting tapestry 610 does not have to resemble a real image.

It is to be appreciated that one or more of the modules of FIG. 6 may be implemented independently or together. For example, the selection module 604 and the location module 608 may be implemented by an optimizer 616 which iteratively selects and locates regions within a tapestry image to determine a best or optimized output tapestry 610 according to selection and/or location criteria, factors, constraints, and the like.

The tapestry 610 may be processed by an image processor 612. For example, boundaries of the selected regions may be smoothed or feathered, and the like. In one example. The transition boundaries between adjacent regions and/or clusters may be convolved with Gaussian kernels of varying bandwidth to blend the boundaries.

The image processor may output a tapestry 614. The image processor may also modify the tapestry image in any suitable manner for its intended use. For example, the image processor may reduce the fidelity of the resulting tapestry image as compared to one or more input images, may modify the size of the tapestry image to fit a particular profile or intended frame such as a data store icon, and the like.

Figure 7:
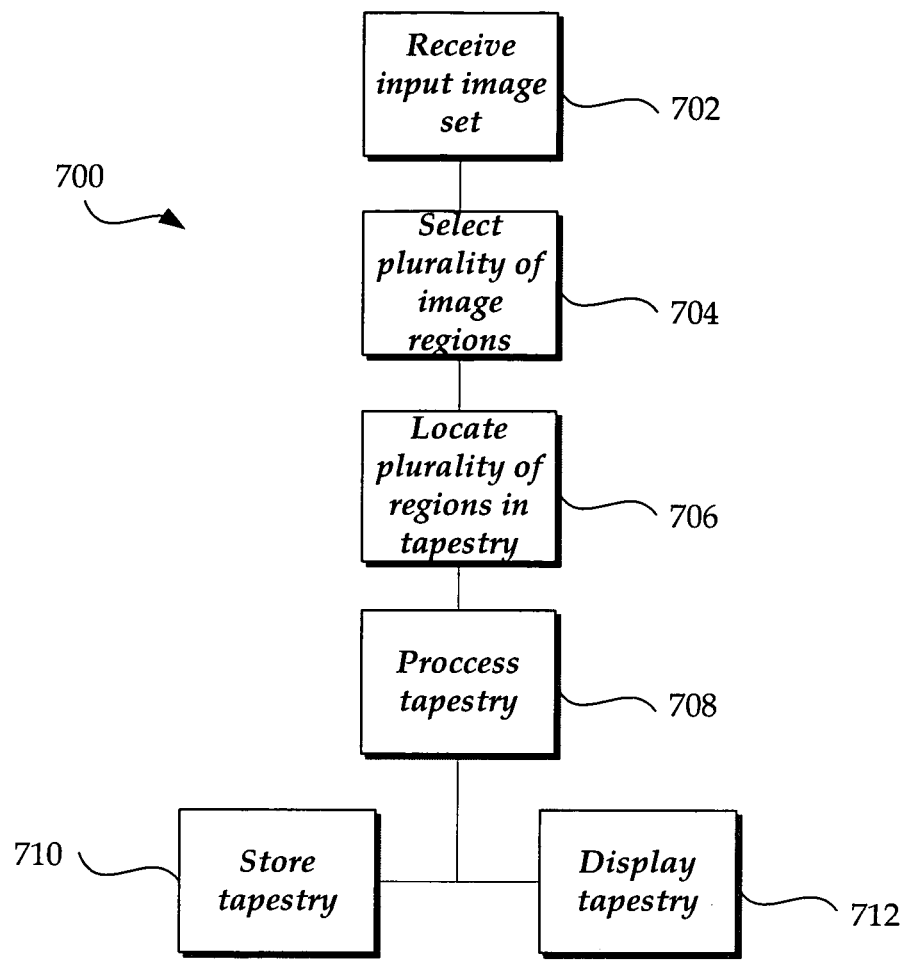
FIG. 7 is a flow chart of an example image tapestry method.

In operation, as shown in the example method of FIG. 7, an input image set containing one or more input images may be received 702. The input images may be received in any suitable manner, such as retrieved from a storage media, received through communication media, output from another application, and the like. The one or more input images may be registered or unregistered, contain image qualities that are the same as and/or different from one or more other input images.

A plurality of selected regions may be selected 704 based on at least a portion of one or more images in the input image set. As noted above, selection of regions for the tapestry may be based on saliency of the regions. Saliency of a region may be based on one or more factors which may include block uniqueness, spatial coherency of blocks, appearance based clustering, similar texture/color edges of the blocks, and the like. The image tapestry framework may not require a-priori scene understanding or detection of generic objects. However, selection of regions and/or location of regions within the tapestry may be based on high-level knowledge, such as face detection.

At least a portion of the selected image regions may be located 706, e.g., positioned, within a tapestry image. Positioning of the regions may be based on one or more factors such as saliency, global positioning of objects (e.g., sky at the top of the image, and the like), image-shift uniqueness, and the like. The tapestry may be processed 708. For example, the montage may be processed to reduce residual visual artifacts, and the like, to provide a tapestry image which may be stored 710 and/or displayed 712. The image tapestry may be stored in any suitable manner, such as in a data store.

Figure 2:
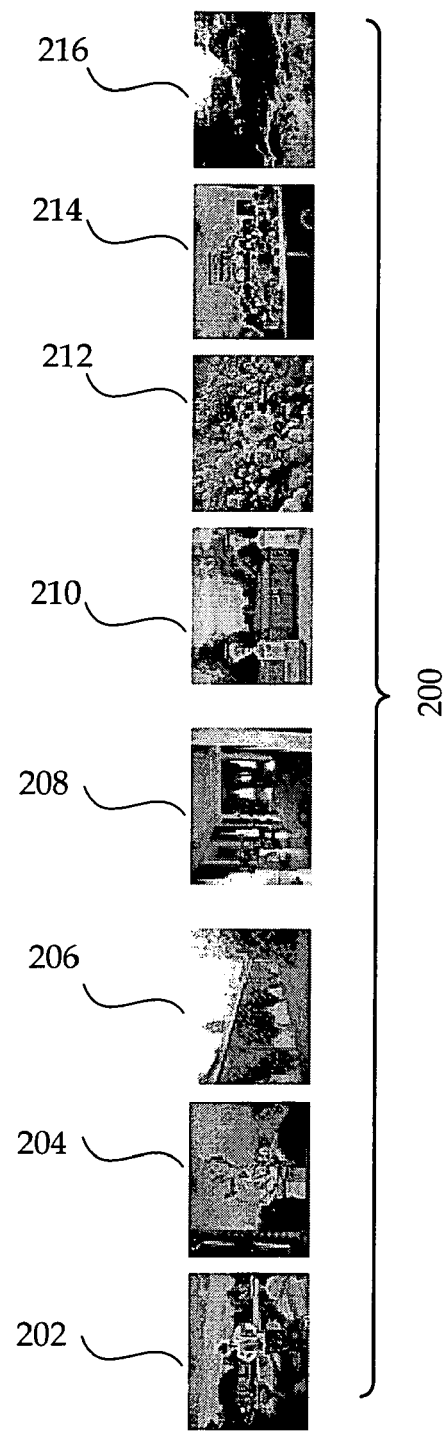
FIG. 2 is an example collection of input images.
Figure 3:
FIG. 3 is an example prior art manual image tapestry of the input images of FIG. 2.
Figure 8:
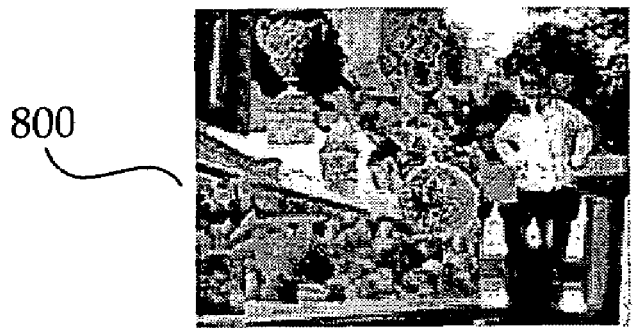
FIG. 8 is an example image tapestry of the input images of FIG. 2.

One example tapestry 800 created automatically by an example image tapestry system is illustrated in FIG. 8 based on the input images of FIG. 2. The image tapestry system may provide an image tapestry which includes salient regions from one ore more of the input images (in tapestry 800, all input images 200 are represented) and may remove redundant or less salient image regions of the input collection.

To measure the saliency of a potential input image region, and to locate a selected input image region in the image tapestry, potential input image regions may be evaluated using an objective function. The objective function may be formed to provide one or more labels indicating a quality of selection and/or location for any potential input image region. The objective function may be optimized, and based on the determined optimal labels of input image regions, the tapestry may be constructed from the input image regions. In one example, the image labels for potential input image regions may include both a selection label and a location label. In this manner, the tapestry may be generated from the most salient image regions and possible neighboring regions of the salient regions to satisfy spatial compatibility.

Any suitable optimization algorithm may be used to optimize the image labels for the image regions of the tapestry. In one example, the objective function indicating the quality of the image region labels may be formed as a Markov Random Field (MRF). To select and locate the image regions for the image tapestry, the MRF energy may be minimized in any suitable manner, such as by using iterated conditional modes, an expansion move algorithm, and the like. In one example, the energy function may be optimized using the example expansion move algorithm of Boykov et. al., "Fast Approximate Energy Minimization via Graph Cuts," PAMI, vol. 23, no. 11, 2001, is incorporated herein by reference. The Boykov expansion move algorithm can only handle energies with metric terms; however, as discussed further below, the tapestry MRF energy may contain hard and/or soft constraints which are non-metric. The Boykov expansion move algorithm may be extended for energy functions with non-metric hard constraints. Additionally or alternatively, the expansion move algorithm may be modified for functions with "almost" metric soft terms.

Labeling

The one or more input images and the resulting tapestry image may be divided into a plurality of image regions. The tapestry image may be created by matching a subset of input image regions to the tapestry, similar to replacing a region by a pixel. Although the following discussion is described with reference to equal sized image regions (e.g., 32×32 pixels) in the input images and the resulting tapestry image, it is to be appreciated that the image regions of the input images and/or the tapestry image may be of different sizes as compared to other regions in the input images and/or the tapestry image. In the examples discussed further below, the input images are of the same size (e.g., 640×480), however, it is to be appreciated that input images of different sizes may be implemented. It is to be appreciated that any number of input images may provide the plurality of tapestry image regions. For example, a single input image may provide two or more image regions for the tapestry. Alternatively, any number of input image regions may be selected and/or placed within the tapestry. It is to be appreciated that the number of images in the input image collection may be evaluated for inclusion within the tapestry, and any number of the images in the collection may provide a source for a selected image region for placement within the tapestry. The resulting tapestry may be the same size as or different from one or more of the input images, and similarly, the input images may be of the same or different size and/or orientation as other images in the input image collection.

To label the tapestry image regions, the parameter I may represent the set of available input images and the parameter i may represent an input image. The parameter K may represent the set of all available input image regions where the parameter k may represent a specific input image region. To represent the image tapestry P, the parameters p, q∈P may represent image regions in the tapestry.

A label space L for the tapestry image may be defined as L=I×S, where S is the set of all possible two-dimensional "region-shifts" of an input image with respect to the tapestry image. The label for a tapestry region may include a source indicator i of the input image for the tapestry region, and/or a shift indicator s providing an indication of the region-shift between the location of the region in the tapestry image as compared to the location of the region in the source image. For example, the tapestry region p may have a position $x_p$ within the image tapestry and may have a label $f_p$ defined as $f_p=(i, s)$ with s∈S. In this manner, the input image region providing a source of the tapestry region may be uniquely derived based on the tapestry region p at position $x_p$ in the tapestry, and its label $f_p=(i, s)$. For example, the input image region may be uniquely defined as $b(p, f_p)=k\in K$, at position $x_p-s$ in image I, where the function $b(p, f_p)$ is the unique (backward) mapping from the pair [p, $f_p$] onto the set of all input regions K.

Figure 9:
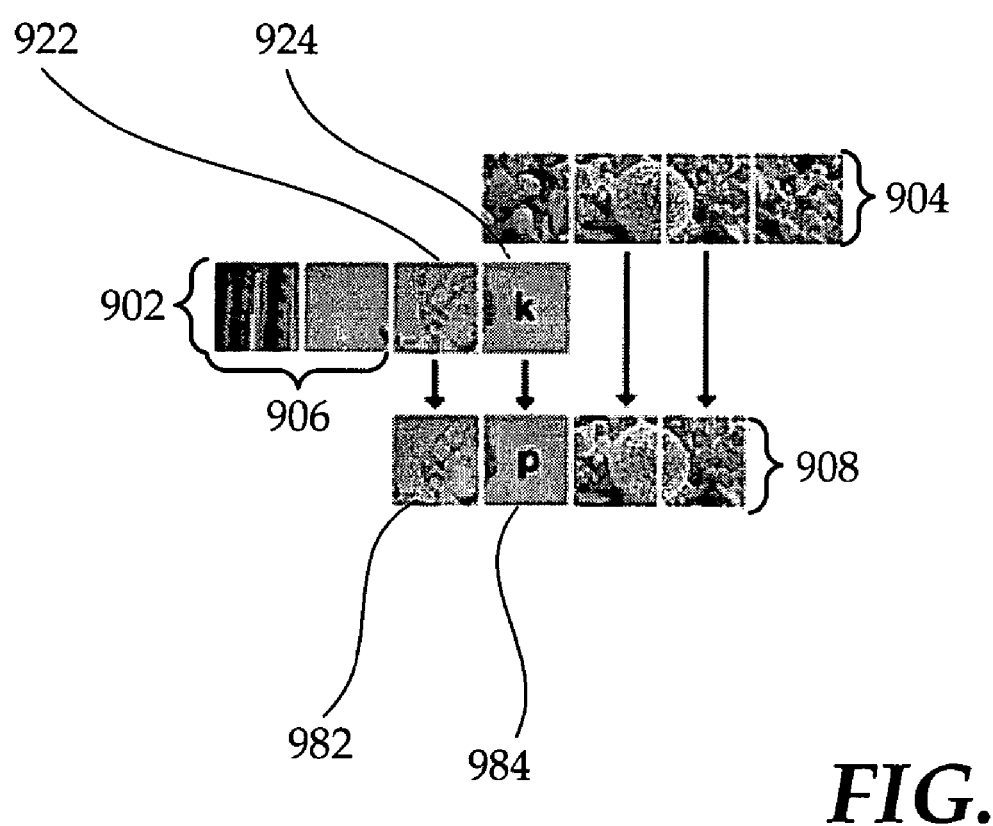
FIG. 9 is a schematic illustration of an example region shifting of representative image regions of the input images of FIG. 2.

FIG. 9 illustrates an example of image region shifting with example tapestry image 908 formed from two image regions from example input image 902 and two image regions from example input image 904. Example image region 982 of tapestry image 908 has a one-dimensional shift indicator 906 value of s=−2 with respect to the example input image region 922 of input image 902. Matching an input region from image 902 to the tapestry 908 may mean that the tapestry region p 984 has label $f_p=(i, s)=(1,-2)$. Furthermore, given the tapestry region at a position $x_p$ and label $f_p$, the position of the input region may be uniquely derived as $x_p-s$. For example, with reference to FIG. 9, the tapestry region (p) 984 has a position $x_p=2$ in the tapestry 908, and a label $f_p=(1,-2)$. In this manner, the position of the input region (k∈K) 924 may be determined as four (i.e., $x_p-s \rightarrow 2-(-2)$). Note that for simplicity this is a one-dimensional illustration, however, multiple dimensions and/or shifting over multiple dimensions may be similarly implemented. Moreover, although the input and tapestry regions are illustrated as 'rectangular blocks', it is to be appreciated that the input and/or tapestry regions may have any perimeter shape, and the shapes of input and/or tapestry regions may be different from each other.

Objective Function

To determine the label f for each tapestry region p, a mapping (configuration) f: P→L may be determined to uniquely assign a label to each tapestry region. An objective function may be formed as an energy function E(f) based on one or more constraints on the selection of input image regions and/or placement of the regions in a tapestry. The energy function may then be optimized to determine both the selection and placement of input image regions to form a tapestry.

The constraints of the energy equation may be determined in any suitable manner. For example, the constraints may provide an indication of the saliency of a potential input image region, and/or may provide a measurement of the rationality of the placement of the selected image region in the tapestry. In one example, one or more unary constraints may define the saliency of a unary input image region. Additionally or alternatively, a pairwise constraint may define the placement of input regions into neighboring regions in the tapestry. Additionally or alternatively, a hard constraint may be used to define selection and/or location constraints on the input and/or tapestry regions. In this manner, the energy for each potential label configuration f may be defined as:

$$E(f) = \sum_{p} D_p(f_p) + \sum_{p,q \in NV} V_{p,q}(f_p, f_q) + \sum_{p,q \in N_H} H_{p,q}(f_p, f_q) \quad (1)$$

where the data term $D_p(\ ) \in = R$ imposes unary constraints on region saliency, the pairwise soft constraint $V_{p,q}(\ ,\ ) \in R$ encodes smoothness between neighboring regions p and q in the tapestry (this means that neighboring regions in an input image are likely also neighboring regions in the tapestry image), and $H_{p,q}(\ ,\ ) \in \{0,\infty\}$ encodes hard constraints which prohibit certain configurations.

An image tapestry may remind a user or provide a 'summary' of the photo collection (typically a personal collection). When individual image regions of the tapestry are considered, some available input image regions may be more informative (salient) than other images to prompt the user's memory or fulfill any other suitable purpose of the image tapestry.

Saliency of the input image regions may be determined in any suitable manner. For example, saliency of image regions may be learned in any suitable manner from labeled data. In another example, input image regions containing pixels with high contrast may be assumed salient. A high contrast image region may be more likely to contain shape information. For instance, an image region of uniform sky may be less salient than a region containing the horizon or objects against the sky, such as shown in the input image regions 920 and 922 of FIG. 9 and the example input image 1002 of FIG. 10. On the other hand, an input image region containing uniform sky may help explain or contextualize a selected neighboring horizon region. In this manner, there may be a spatial constraint of neighboring regions, to be discussed further below.

To determine the input image regions containing pixels of high contrast, the input image may be smoothed and down-sampled, so that an image region is of a smaller size. The size may be any appropriate size, such as 2×2 pixels. The contrast may be computed as the sum of the gradient magnitudes within the down-sampled image region. In this manner, the unary constraint data term of equation (1) may be defined as:

$$D_p(f_p) = -\text{Saliency}(b(p, f_p)) \quad (2)$$

where Saliency may be implemented as the entropy of a region, i.e., Saliency=Sum(k) xk*log(1/xk) where Sum(k) is the sum of all k elements (pixels) of the region and xk is the value of an element, e.g. color of the pixel.

In some cases the tapestry may receive an image region from each of two or more input images of an input image collection or set. In some cases, the tapestry image may receive one or more input regions from a plurality (and sometimes all) of the input images. In order to encourage that each input image contributes at least one input image region to the tapestry, the saliency value of one or more (or all) input image regions of one input image may be normalized to one.

Additionally or alternatively, a heuristic assumption may be implemented such that the center of an input image is considered more informative (e.g., salient) about the image's content than the border. For example, image regions coming from the center of an input image may be weighted more highly than image regions coming from the border of an input image. Weighting of the position of the input image may be implemented in any suitable manner. For example, the data term D of equation (2) may be multiplied by a weighting function based on the relative position or distance of the input image region to the center of the input image. In another example, a smooth Gaussian with the origin on the input image center may be used. It is to be appreciated that other locations and/or relative distances may be weighted as appropriate. For example, image regions at the edge of an input image may be weighted lower than other image regions, image regions located near an identified object may be weighted higher than other image regions, and the like.

Figure 10:
FIG. 10 is an example collection of input images.
Figure 11:
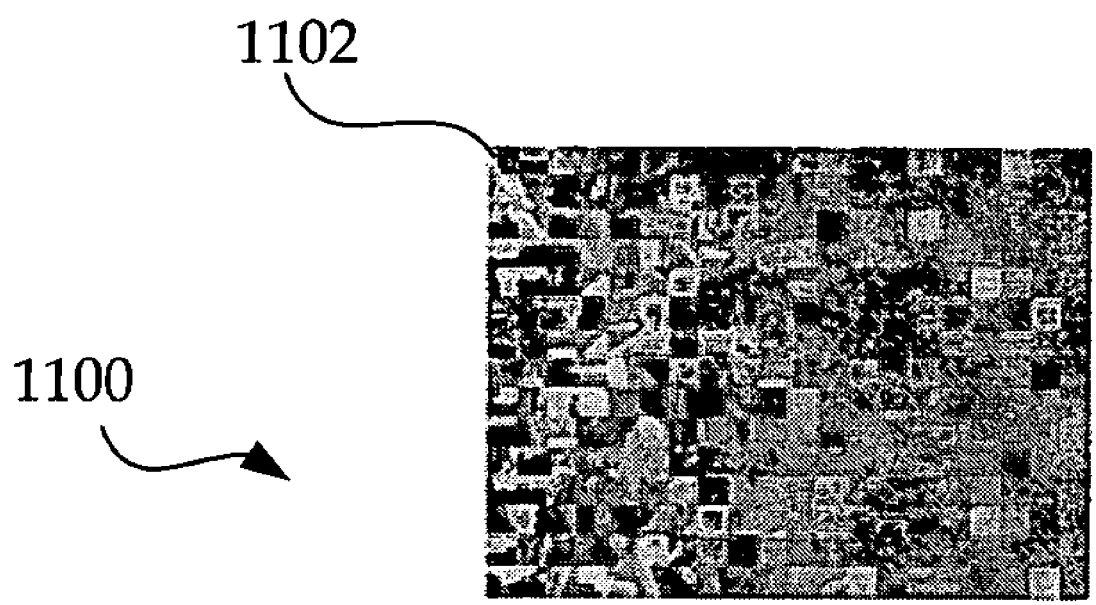
FIG. 11 is an example tapestry of salient image regions with region uniqueness of the input images of FIG. 10.

The salient regions of the example input images of FIG. 10 are shown in the example tapestry 1100 of FIG. 11. The most salient region of all input regions is shown in the upper left corner image region 102 and the remaining illustrated regions decrease in saliency down the column and to the right (column-wise starting top, left).

Figure 12:
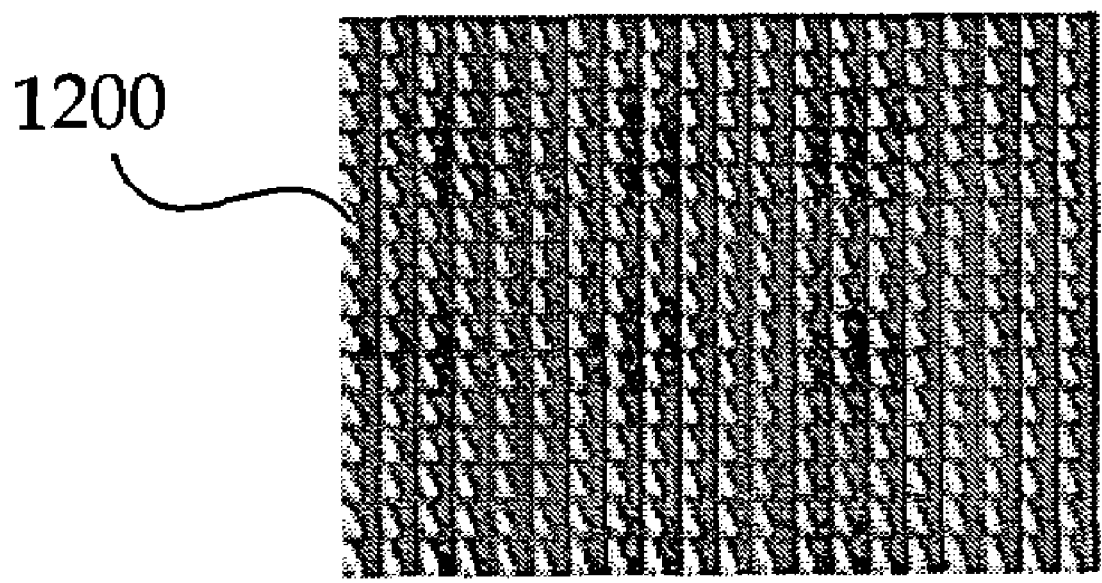
FIG. 12 is an example tapestry of salient image regions without block uniqueness of the input images of FIG. 10.

Optimizing the energy equation for E(f) above with the saliency constraint as the only term may have the effect that the most salient region is duplicated over the whole tapestry, as shown in the example tapestry image 1200 of FIG. 12. More particularly, without a region uniqueness constraint, the most salient region of the one or more input images is duplicated over the whole tapestry. To avoid this, the energy may be constrained so that any two tapestry regions are from different input regions, i.e., $b(p,f_p) \neq b(q,f_q)$ for all blocks p, q. In terms of energy, the region uniqueness constraint may be written as a hard constraint of the form:

$$H_{p,q}(f_p, f_q) = \infty \text{ if } b(p, f_p) = b(q, f_q) \quad (3)$$

This hard constraint may provide a matching problem, such that a mapping may be desired and found between input image regions and tapestry regions such that each tapestry region has one matching input image region.

FIG. 11 illustrates an example tapestry 1100 which includes both the saliency constraint described above and the block uniqueness constraint. However, a tapestry which contains just the most salient regions may not be very informative, as shown in the example tapestry 1100 of FIG. 11. Accordingly, in order to capture larger, salient image regions which contextualize the salient portions of the input image, image region clusters may be "grown" in the tapestry to contain two or more input image regions that are from the same input image. Multiple input image regions forming an image region cluster from an input image may be selected in any suitable manner. For example, a spatial constraint on the input region selection may be provided which adds a spatial coherence constraint on the selection of regions for the input image cluster for the tapestry.

Figure 13:
FIG. 13 is an example tapestry with constant pairwise constraint (MRF with Potts model) of salient regions of the input images of FIG. 10.

In one example, the spatial coherence constraint may be modeled with a Markov random field (MRF) with a Potts model. This soft region coherence constraint $V_{p,q}$ may be added to the energy equation such that:

$$V_{p,q}(f_p, f_q) = \lambda_1 \text{ if } f_p \neq f_q \qquad (4)$$

where the spatial coherence function provides a measure of the spatial coherence of the tapestry. For example, the coherence function V may have a neighborhood system $N_V$ and the weight $\lambda_1$ decides how spatially coherent the tapestry is. The weight $\lambda_1$ may be any suitable determined value such as 0.01. FIGS. 18-21 illustrate increasing values of $\lambda_1$ where $\lambda_1$ of FIG. 18 $<\lambda_1$ of FIG. 19 $<\lambda_1$ of FIG. 20 $<\lambda_1$ of FIG. 21. In one The neighborhood system $N_v$ may be any suitable neighborhood system such as 2, 4, 8, 16 and the like. Note that neighboring tapestry regions p, q with identical labels $f_p = f_q$ are always neighboring regions in the input image. The example tapestry 1300 of FIG. 13 illustrates a tapestry with a saliency constraint as discussed above, a constant pairwise region coherence constraint provided by a Markov random field with a Potts model, and a region uniqueness constraint as discussed above.

Additional or alternative constraints may be used to constrain the selection and/or placement of the input image regions in the tapestry to meet user desirable criteria in the resulting tapestry image. For example, the tapestry criteria may be based on intermediate and high-level knowledge, as discussed further below. In one example, the coherence constraint provides a manner to select one or more coherent image regions from one or more of the input images to form an input region cluster for the tapestry. However, the image region clusters may be placed in the tapestry in a manner that does not seem physically possible (localization of placement) or spatially pleasing (e.g., cluster coherence).

The placement of the salient regions from different input images in the tapestry may be include, as noted above, placing neighboring input image regions adjacent to one another in the tapestry, e.g., forming an image cluster. The placement of the image clusters in the tapestry i.e., a location constraint, may be formulated by introducing a hidden variable, h, which can be seen as a cluster variable representing the appearance of clusters of the input image blocks.

Figure 14:
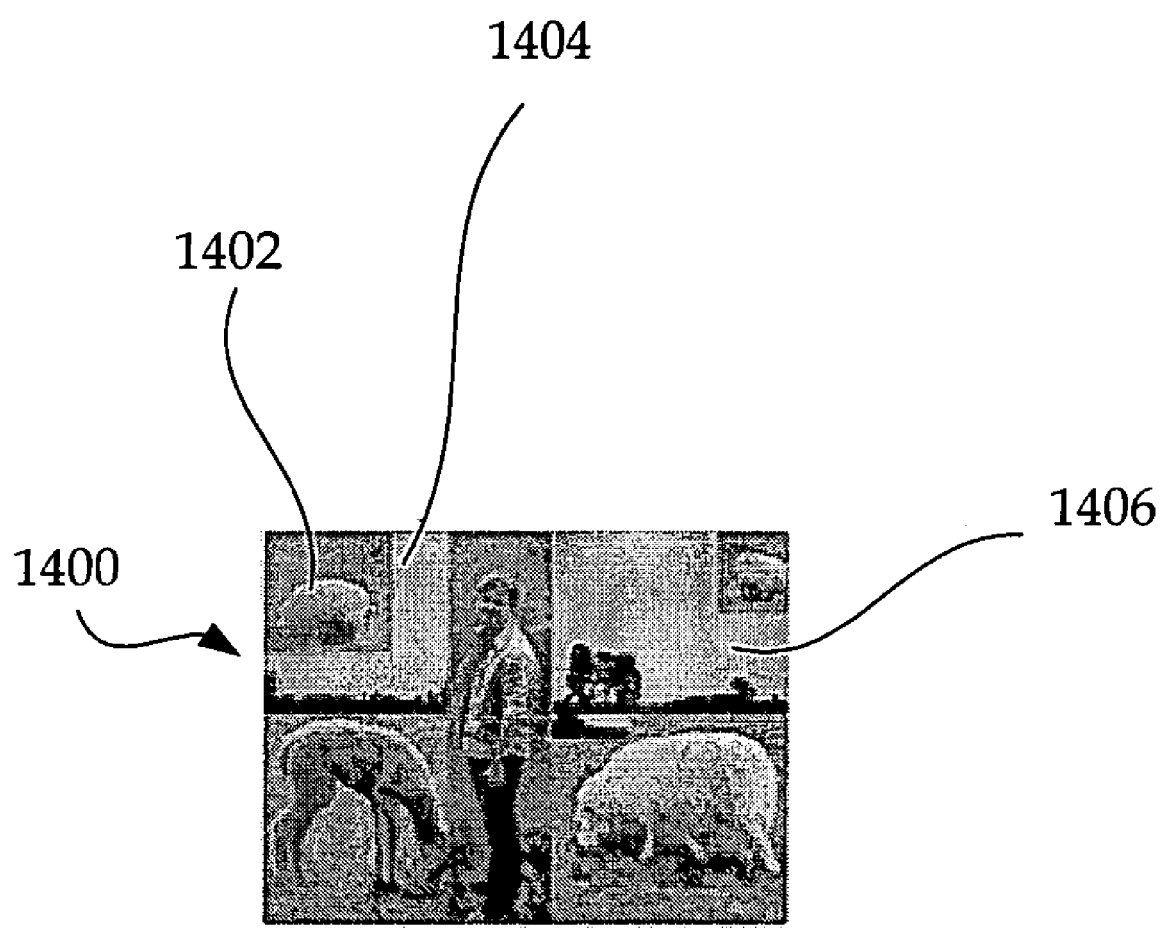
FIG. 14 is an example tapestry with a pairwise constraint and location constraint of salient regions of the input images of FIG. 10.

Any suitable appearance characteristic may be used to represent the appearance of one or more clusters. For example, the appearance of a region may be based upon the appearance of one or more image regions within the cluster. In one example, a region's dominant color may be used to represent the 'appearance' of the region, and the appearance of the cluster may be the distribution of the regions having a particular appearance over the area of the image cluster. The distribution over locations, $x_p$, in the tapestry for a given region $k = b(p, f_p)$ may be expressed as:

$$P(x_p|k) = \Sigma_h P(x_p|h) P(h|k) \qquad (5)$$

where $P(x_p|h)$ encodes the tapestry placement preference of certain cluster of regions to appear at particular locations (e.g., sky tends to be on the top of an image, grass tends to appear at the bottom of the image, and the like). The second term, $P(h|k)$, of equation (5) indicates the cluster membership of the given region k. This term may be obtained using expectation maximization or any other suitable learning process for mixture of Gaussian (MoG) clustering. Assuming the independence of the image region, the first term, $P(x_p|h)$, of equation (5) can be written as, $$P(x_p \mid h) \propto \prod_{k' \in K} \delta(x_{k'} - x_p) p(k' \mid h) \qquad (6)$$

where $\delta(t) = 1$ if $t = 0$ and $\delta(t) = 0$ otherwise, and $p(k'|h)$ is the cluster likelihood, obtained directly from MoG. The location constraint may be added to the data term of equation (2) defined above as:

$$D_p(f_p) \rightarrow D_p(f_p) - \lambda_2 \log P(x_p | k = b(p, f_p)) \qquad (7)$$

where $P(x_p|k=b(p,f_p))$ may be determined from equations (5) and (6) above and the parameter $\lambda_2$ may be set to any appropriate weighting value. The value of the parameter $\lambda_2$ may be set to any suitable value, such as 0.0001. FIG. 13 illustrates an example tapestry 1300 with a saliency constraint, a constant pairwise region coherence constraint provided by a Markov random field with a Potts model, and a region uniqueness constraint, but without the location constraint defined in equation (7). FIG. 14 illustrates an example tapestry 1400 with a saliency constraint, a constant pairwise region coherence constraint provided by a Markov random field with a Potts model, a region uniqueness constraint, and the location constraint defined in equation (7).

As noted above, an image tapestry may have the image regions placed realistically. However, region and/or cluster transitions without an appearance transition constraint may not place the image regions realistically. For example, the example tapestry 1400 of FIG. 14 shows that many region transitions may violate this constraint, e.g., the sheep have grass as background, however, are placed in the sky as shown by the cluster 1402. Accordingly, an appearance based region transition constraint may be introduced by modifying the pairwise constraint of equation (4) above in the energy equation (1) above by:

$$V_{p,q}(f_p, f_q) = \lambda_1 + \lambda_3 \min(\|C(b(p,f_p)) - C(b(p,f_q))\|_2, \|C(b(q, f_q)) - C(b(q,f_p))\|_2) \text{ if } f_p \neq f_q \qquad (8)$$

where $C(k)$ is the appearance of region k, which may be an appearance characteristic of the region, such as the dominant color of the region. The parameter $\lambda_3$ represents any appropriate weighting term and may be set to any suitable value such as 0.0001. To be robust to salient regions containing two or more different textures, the min( ) function may be used. Since the pairwise constraint V might be non-metric, the optimization of the energy function (such as through the expansion move algorithm) may be extended as discussed further below to evaluate the pairwise constraint.

The location constraint may increase the likelihood of placing clusters containing certain textures/colors (or any other appearance characteristic) in particular locations in the tapestry, and the appearance constraint may form and place clusters next to other clusters of similar appearance characteristics, e.g., textures. For example, as shown in the tapestry image 1500 of FIG. 15 with appearance dependent MRF (in addition to a saliency constraint, a constant pairwise region coherence constraint, a region uniqueness constraint, and the location constraint), transitions between neighboring regions and/or clusters may be realistic, e.g., the sheep of cluster 1402 of FIG. 14 are now placed in a cluster 1502 on a grass background next to other clusters with a grass background. In addition, the clusters 1404, 1406 depicting sky image regions of FIG. 14 are now expanded (e.g., more 'sky' image regions are selected to form the cluster) and placed in tapestry 1500 as cluster 1504. However, to make 'room' in the tapestry for placement of the additional 'sky' regions to meet the appearance constraint, the head of the person in image cluster 1508 has been partially removed.

In some cases, two regions, each depicting portions of one object from a single input image, both appear in the tapestry, but are mutually mis-registered, i.e., the regions and/or clusters are placed with a different image-shift. For example, the upper part of the body in image cluster 1508 is mis-registered with the legs in image cluster 1510 shown in the example tapestry of FIG. 15. To reduce the mis-registration of regions and/or clusters depicting the same object, a hard constraint may be introduced that places every region and/or cluster selected in the tapestry from a single input image with one unique shift. More particularly, with image-shift uniqueness, each selected region from a single input image may appear and be placed with one unique shift in the resulting tapestry image.

An image-shift uniqueness constraint on the placement of image regions and/or clusters may also affect the selection of image regions and/or clusters for placement within the tapestry. More particularly, the image-shift uniqueness constraint ensures that all regions and/or clusters from a single input image may be placed within the tapestry with the same image shift, which then affects the placement of multiple clusters from one input image, even if those clusters depict different objects from the same input image. Thus, fewer image regions and/or clusters may be selected from an input image for placement in the resulting tapestry. In some cases, less salient image regions and/or clusters may no longer be selected since they would be placed in the tapestry at a different image-shift than a more salient input image region and/or cluster from the same input image.

Figure 15:
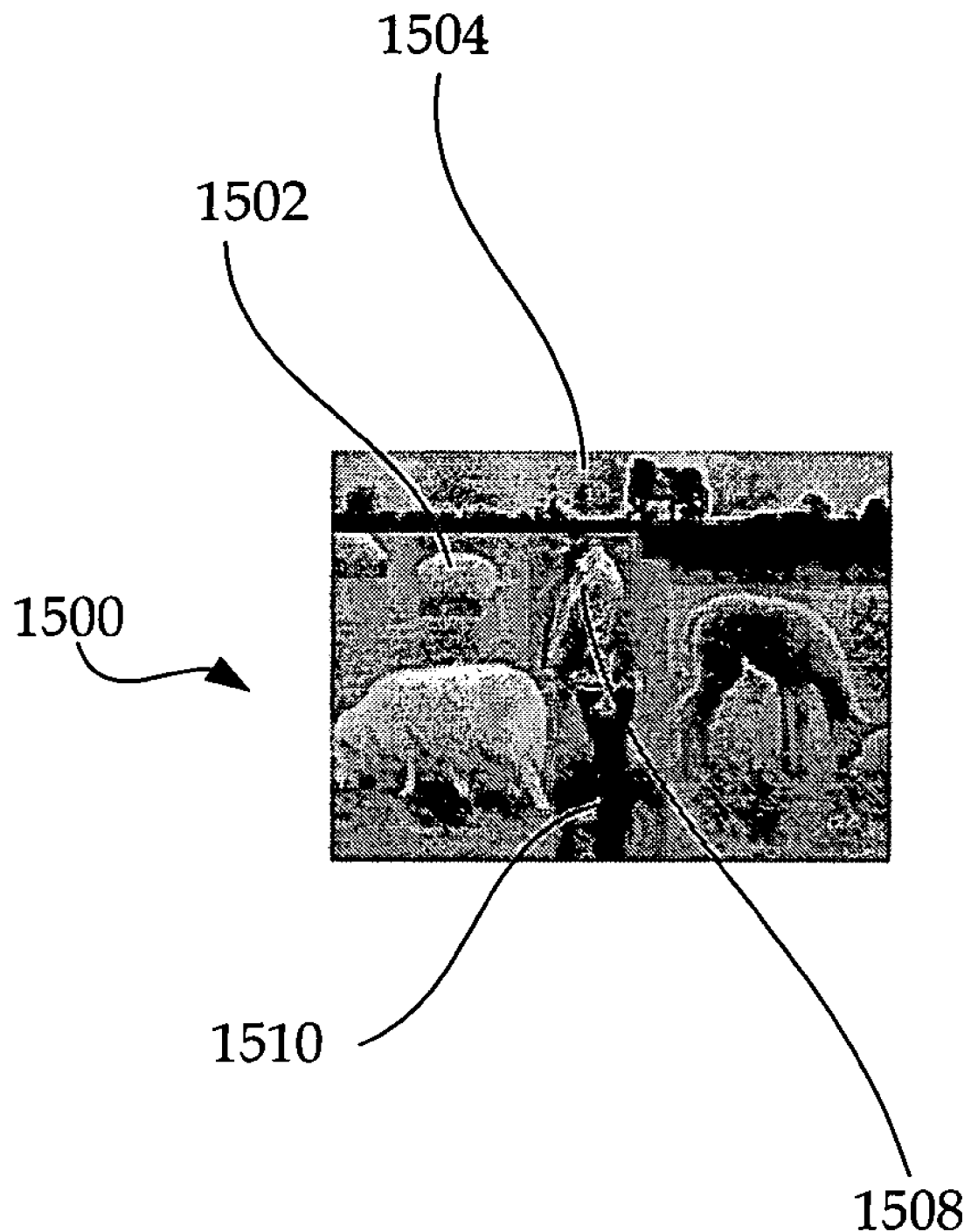
FIG. 15 is an example tapestry with a pairwise constraint, a location constraint, and appearance dependent MRF constraint of salient regions of the input images of FIG. 10.
Figure 16:
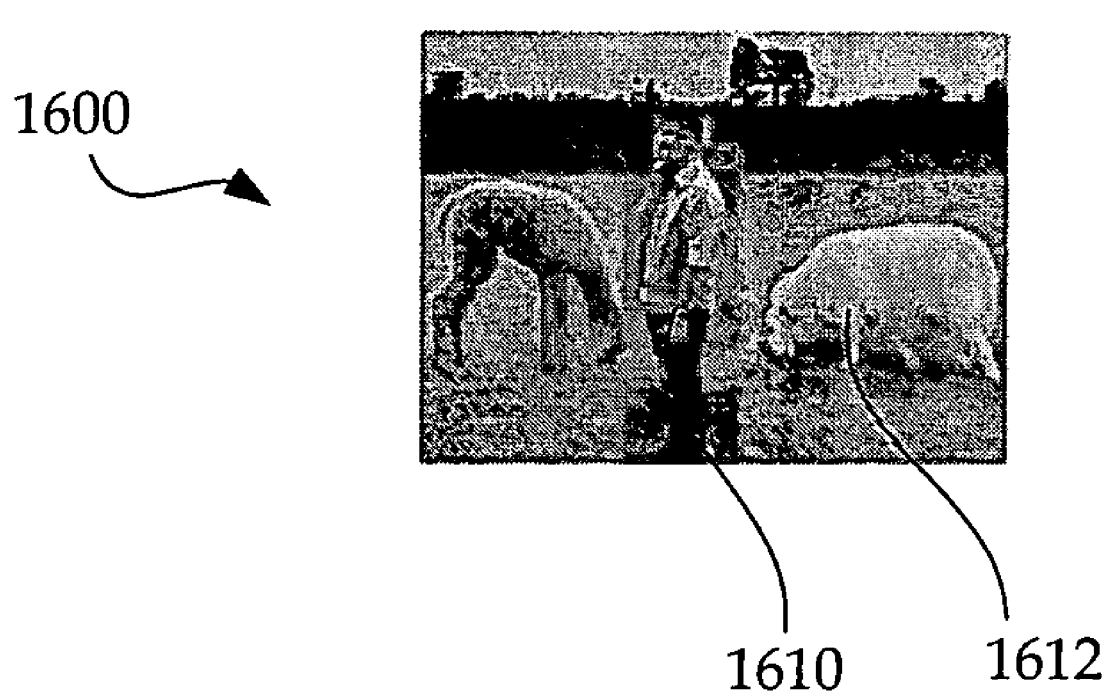
FIG. 16 is an example tapestry with a pairwise constraint, a location constraint, appearance constraint, and image-shift uniqueness and face detection of the salient regions of the input images of FIG. 10.

For example, as shown in the example tapestry 1600 of FIG. 16, the upper body and legs (clusters 1508, 1510 of FIG. 15) are placed adjacent each other as a single cluster 1610. In addition, the image cluster 1502 of FIG. 15 depicting a small sheep from input image 1004 of FIG. 10 is no longer depicted in the tapestry 1600 of FIG. 16 since that image cluster was measured to be less salient than the image cluster 1612 depicting another sheep from the same input image, and the small sheep of cluster 1502 could not be placed in the tapestry without violating the image-shift uniqueness constraint applied to the tapestry of FIG. 16.

Any suitable method may be used to implement an image shift uniqueness constraint in the energy equation (1). For example, the label $f_i \in S$ may be selected to represent the shift s of input image i. In this manner, the hard region uniqueness constraint H of equation (3) above used in the energy equation (1) above may be modified by the image-shift uniqueness constraint as:

$$H_{p,i}(f_p,f_i)=\infty \text{ if } f_p=(i, s) \text{ and } f_i \neq s \qquad (9)$$

An alternative or additional option for reducing two differently shifted parts in the tapestry (e.g., implementing an image-shift uniqueness constraint) involves object detection. An object detection system may identify that regions in an input image belong to the same object, such as a face shown in input image 1006 of FIG. 10. The regions depicting a single object may be selected and placed as a connected region or cluster in the tapestry. To ensure that the entire object is selected (e.g., selecting all input image regions depicting a portion of the object in an input image), and to ensure that the entire object is depicted as a whole in the tapestry (e.g., placing all image regions depicting a portion of the object together and with the same image shift), the hard constraint H of equations (3) and/or (9) above may be augmented with a hard object constraint of $$H_{p,q}(f_p,f_q)=\infty \qquad (10)$$

if $f_p \neq f_q$ and $b(p,f_p)$ and $b(q,f_q)$ are two blocks of the same object and/or a face is detected The face and/or object detection system may be implemented by any suitable method or technique including that described further in Viola, et al., "Rapid Object Detection using a Boosted Cascade of Simple Features," CVPR, Vol. 1, 2001, which is incorporated herein by reference. The example tapestry 1600 of FIG. 16 illustrates a tapestry with a face detection constraint implemented in the energy equation. As illustrated, the face of the person in cluster 1610 is 'whole' whereas the cluster 1508 of FIG. 15 does not include the whole face of the depicted person.

Since faces may be important to prompt a user's memory (i.e., more salient), the face of each person present in the photo collection may be included in the tapestry. In this manner, the selection of an image region for placement within the tapestry may be augmented by the object and/or face detection in the input image.

To include the object and/or face detection in the image region selection, the data term D of equations (2) and/or (7) above may be modified to identify a label $b(p,f_p)$ of an identified "object block" to:

$$D_p(f_p)=-\text{const} \qquad (11)$$

where const>max(D( )+8 max(V( ; )) and D and V depend on the data.

In some cases, a constraint may be applied which reduces the risk of duplicating faces of the same person in the tapestry image. Any suitable method or constraint may be used to include a single object block for each person or identified object. For example, only those "object blocks" which appear in the input image with the most faces (typically a group photograph) may be adapted; one input image may provide all the identified object blocks (which may be the image with the most faces detected); face detection may be expanded to identify the person and ensure that the identified person is included in the tapestry only once, and the like. The object duplication may be implemented through the data term D of equation (11) above in any suitable manner.

In a typical photo collection, multiple version of very similar images frequently appear, e.g., same shot with different lighting, perspective, framing, orientation, and the like. Since the tapestry may only represent a fraction of one or more or even all input images, different tapestry regions with very similar appearance may be depicted in some cases depending on tapestry size and the value of parameter $\lambda_1$ of the spatial coherence constraint of equation (4) above. To reduce the selection of multiple regions and/or clusters depicting similar images, "similar" images may be classified and the constraint that the tapestry must contain only one sample image region per classification may be included.

The input image classification may be based on any one or more factors, which may include, localized image or region properties, global image properties, identified objects within the images, and the like. For example, the input images may be classified based on global image properties, such as histogram of colors and/or chi-square distance. The histogram of colors may be determined in any suitable manner such as that described further in Swain et al., "Color Indexing," IJCV, vol. 7, no. 11, 1991, pp. 11-32, which is incorporated herein by reference.

To implement the input image classification into the energy equation (1) above, a classification variable may be defined as $c \in C$ and may have an associated label $f_c \in I$ which denotes that the cluster c, if present in the tapestry, is represented by image $f_c$. The class uniqueness constraint may be added to the hard constraint of equations (3), (9), and/or (10) above as:

$$H_{p,c}(f_p, f_c) = \infty \text{ if } f_p = (i,s), b(p, f_p) = c \text{ and } f_c \neq I \quad (12)$$

The class uniqueness constraint may be extended from redundant image detection to redundant region detecting, which may implement a reliable and un-supervised texture clustering, as discussed further in Carson, et al, "Blobworld: Image Segmentation using Expectation Maximization and its Application to Image Querying," PAMI, vol. 24, no. 8, 2002, pp. 1026-1038, which is incorporated herein by reference.

Using image regions and/or clusters containing multiple pixels of the input image may introduce noticeable artifacts. For example, true object boundaries may be missing, like the hairline of the person. Visual artifacts may be reduced and/or removed by having the region and/or cluster boundary follow existing object boundaries. Any suitable method to implement a cluster boundary following an object boundary may be appropriate such as the graph cut textures as described in Kwatra, et al., "Graphcut textures: Image and Video Synthesis Using Graph Cuts," ACM Transaction on Graphics, vol, 22, no. 3, SIGGRAPH 2003, pp. 313-318, which is incorporated by reference herein.

Figure 17:
FIG. 17 is an example tapestry with a pairwise constraint, a location constraint, appearance constraint, image-shift uniqueness, face detection, and visual artifact removal of the salient regions of the input images of FIG. 10.

Additionally or alternatively, the colors at the boundaries between the regions and/or clusters may be adjusted (such as by the image processor 612 of FIG. 6) since the boundaries between the regions and/or clusters introduce an artificial seam, e.g., transition from dark to bright grass. The colors at the boundary may be adjusted using any suitable method or technique including, without limitation, feathering within a ribbon around the seam. One suitable example of feathering within a ribbon is described in Uyttendaele, et al, "Eliminating Ghosting and Exposure Artifacts in Image Mosaics," CVPR, vol. 2, 2001, pp. 509-519, which is incorporated herein by reference. Since the true object boundaries may be desired to be kept intact, e.g., unblurred, the size of the ribbon following the region and/or cluster boundary may depend on the strength and/or disparity of the existing boundary. One example tapestry with a localization constraint, appearance dependent MRF, image-shift uniqueness, face/object detection, class uniqueness, and visual artifacts removal is shown in the example tapestry 1700 of FIG. 17.

Energy Minimization

The optimization framework for minimizing the energy of the selection and/or placement constraints, whatever factors are included, may use any suitable optimization algorithm such as the graph cut based expansion move algorithm, iterated conditional modes (ICM), loopy belief propagation, constrained ICM, standard expansion moves with random expansion order, modified expansion moves with parallel expansion order, and the like. One suitable constrained iterated conditional mode optimization is described by Besag, "On the statistical analysis of dirty picture," J. Royal Statistical Society of London B, Vol. 48, 1986, pp. 259-302. The energy and initialization for each optimization algorithm may be the same or different as appropriate.

In one example, to minimize the energy function of equation (1) (which may be a fully connected MRF model) including the saliency constraint, the region coherence constraint, and the region uniqueness constraint may be NP-hard. More particularly, the energy function with the region uniqueness constraint and the region coherence constraint gives a problem which may be called matching with smoothness.

In one example, the expansion move algorithm may be implemented, such as that described further by Boykov et al., "Fast approximate energy minimization via graph cuts," PAMI, vol. 23, no. 11, which is incorporated herein by reference. In each step of the expansion move algorithm, the number of edges needed for enforcing the region uniqueness constraint may be at most linear in the number of tapestry regions. For example, in one case, 12 input images may be used with a block size of 32×32 pixels. The number of tapestry nodes may be 15×20=300 and the number of labels may be 12×300=3600. The neighborhood may be the four nearest neighboring image regions.

The expansion move algorithm has been used for the matching with smoothness problem in the context of matching two input stereo images. Example expansion move algorithms for stereo are described by Kolmogorov, et al., in "Computing visual Correspondence with Occlusions using Graph Cuts," ICCV, Vancouver, Canada, 2001, pp. 508-515 and in "Multi-camera Scene Reconstruction via Graph Cuts," ECCV, Vol. 3, 2002, pp. 82-96, which are incorporated herein by reference. However, stereo is symmetric, i.e., occlusions are allowed in both left and right images. In contrast to stereo, the tapestry framework may by asymmetric, i.e., allow "occlusions" (e.g., non-matched regions) for input regions but may not allow occlusions for tapestry regions. To account for the asymmetry of tapestry matching with smoothness, stereo expansion move algorithms may be adapted to the tapestry framework in any suitable manner. For example, appropriate occlusion penalties may be set to infinity. However, the graphs constructed during α-expansion steps may contain approximately twice as many nodes as in the tapestry framework formulation discussed further below.

The energy function may contain non-metric (soft and/or hard) constraints, which can not be handled by the standard expansion move algorithm of Boykov. Therefore, the expansion move algorithm may be extended for functions with non-metric hard terms and/or for general functions with non-metric soft terms.

Extended Expansion Move Algorithm

The expansion move algorithm reduces minimizing the energy function E with multiple labels to a sequence of binary minimization problems. These subproblems are called alpha expansions. Alpha expansions are described further in Boykov et al. cited above, and Kolmogorov, et al., "What Energy Functions can be Minimized via Graph Cuts?," PAMI, vol. 26, 2, 2004, which is incorporated herein by reference.

Having a current configuration (i.e., set of labels) f and a fixed label $\alpha \in L$ in the α-expansion operation, each image region $p \in P$ of the tapestry being evaluated makes a binary decision: it can either keep its old label $f_p$ or switch to label α. Therefore, a binary vector $x \in \{0,1\}^P$ may be introduced that defines the auxiliary configuration f[x] as follows:

$$\forall p \in P f[x]_p = f_p \text{ if } x_p = 0 \text{ or } f[x_p] = \alpha \text{ if } x_p = 1 \quad (13)$$

The auxiliary configuration f[x] transforms the energy E with multiple labels into an energy function of binary variables where:

$$E(x) = E(f[x])^4 \quad (14)$$

In this manner, the energy function E of binary labels may be written as:

$$E(x) = \sum_p E_p(x_p) + \sum_{p,q \in N} E_{p,q}(x_p, x_q) \quad (15)$$

where $N=N_V \cup N_H$ (where $N_V$ is the neighborhood system for the region coherence and NH is the h=neighborhood system for the hard constraint. The term E represents the energy for binary variables and the term E represents the energy for multiple labels. Individual terms of the energy E for binary variables of equation (15) are defined by the terms of the energy equation E for multiple labels (i.e., equation (1) above). For example, for $p,q \in N_V$, the energy for binary labels and associated pairwise constraint V may be provided as:

| | |
|---|---|
| $E_{p,q}(0,0)$ | $E_{p,q}(0,1)$ |
| $E_{p,q}(1,0)$ | $E_{p,q}(1,1)$ |
| $V_{p,q}(f_p, f_q)$ | $V_{p,q}(f_p, \alpha)$ |
| $V_{p,q}(\alpha, f_q)$ | $V_{p,q}(\alpha, \alpha)$ |

As described further below, the global minimum of E can be computed using graph cuts.

The expansion move algorithm starts with an initial configuration $f^0$. The expansion algorithm then computes optimal $\alpha$-expansion moves for labels $\alpha$ in some order until convergence, accepting the moves only if they decrease the energy E of binary labels. The output of the expansion move algorithm is a strong local minimum of the energy E of binary labels characterized by the property that no $\alpha$-expansion can decrease the energy E (energy for multiple labels).

In some cases, the constraints included in the energy E of multi-labels may determine if a strong local minimum may be obtained efficiently, e.g., if the energy E is regular. The prior art considered the case when the hard constraint term H in the energy equation E of equation (15) is not present. For example, the Boykov alpha expansion provides a graph construction which is applicable when the pairwise constraint V is a metric. This condition was generalized to show that the energy E of binary labels can be minimized efficiently if it is regular, i.e., each term $E_{p,q}$ satisfies the following inequality:

$$E_{p,q}(0,0)+E_{p,q}(1,1) \leq E_{p,q}(01)+E_{p,q}(1,0) \quad (16)$$

In a similar manner, the energy function E of equation (15) will be regular for any $\alpha$-expansion if the pairwise term V satisfies the following inequality:

$$V(\beta,\gamma)+V(\alpha,\alpha) \leq V(\beta,\alpha)+V(\alpha,\gamma) \text{ for all labels } \alpha,\beta,\gamma \quad (17)$$

In this manner, the pairwise constraint V may be referred to as expansion-regular.

The class of energies which are guaranteed to converge to a strong local minimum may be extended to include a non-metric hard constraint. Specifically, a general hard constraint term H may be allowed that does not need to be expansion-regular.

To expand the $\alpha$-expansion algorithm, each term $V_{p,q}$ in the energy equation for E of equation (1) may be expansion-regular and each term $H_{p,q}(\ ;\ ) \in \{0;\infty\}$ may have a zero diagonal, i.e., $H_{p,q}(\alpha,\alpha)=0$ for any label $\alpha$. In this manner, the function E in the energy equation (15) above, for any $\alpha$-expansion, will be regular assuming that the initial configuration (set of labels f) satisfies the hard constraints, i.e., $E(f^0)<\infty$.

More particularly, since $E(f^0)<\infty$, the hard constraint $H(f_p,f_q)$ is zero for all regions p,q. The energy E for an $\alpha$-expansion move is regular since the pairwise constraint $V_{p,q}$ is expansion-regular and the inequality of:

$$H(\alpha,f_q)+H(f_p,\alpha) \geq H(f_p,f_q)+H(\alpha,\alpha)=0 \quad (18)$$

is valid for all p, q. After $\alpha$-expansion, the energy of new labeling $f^1$ is still finite since $E(f^1) \leq E(f^0)<\infty$. Therefore, the same argument (i.e., use induction) may be applied such that the energy function E of equation (15) above is regular if the initial condition satisfies the hard constraints of $E(f^0)<\infty$. Thus, a strong, local minimum of the multi-label energy function E may be determined for any $\alpha$-expansion.

In some cases, not all terms of the pairwise constraint $V_{p,q}$ are expansion-regular. However, the number of such terms may be relatively small. The expansion move framework may be modified to include a term that is not expansion regular.

Suppose that during the $\alpha$-expansion step, an energy function E is obtained where some of the terms $E_{p,q}$ are not regular. A graph may be constructed using the $\alpha$-expansion algorithm for such a term. However, the resulting graph would contain edges with negative weights. With the negative weights of the graph, a max-flow algorithm cannot be applied in some cases. Accordingly, the non-regular terms of the energy $E_{p,q}$ may be "truncated", i.e., replaced with regular terms $\hat{E}_{p,q}$ (defined further below), and then the new function E may be minimized.

To truncate the non-regular terms, the truncated energy function $\hat{E}$ and energy function E may be evaluated to determine if they satisfy the following conditions: Unary terms $\hat{E}_p$ and $E_p$ are the same; and for any p and $q \in N$, then $\hat{E}_{p,q}(0,0) \leq E_{p,q}(0,0)$ and $\hat{E}_{p,q}(x_p,x_q) \geq E_{p,q}(x_p,x_q)$ for $(x_p,x_q) \neq (0,0)$. If $x^*$ minimizes the truncated function $\hat{E}$ then the energy of the proposed $\alpha$-expansion move $E(x^*) \leq E(0)$, where $E(0)$ is the energy of the current configuration.

More particularly, unary terms $E_p$ may be assumed to be not present since they can be viewed as pairwise terms. In this manner, the neighborhood $N_0$ may be denoted as $N_0 = \{p, q \in N | (x_p^*, x_q^*) = (0,0)\}$, $N_1 = N \setminus N_0$ and $C = \Sigma_{p,q \in N_0} E_{p,q}(0,0)$. Accordingly, the energy equation of the proposed $\alpha$-expansion move may be constructed as:

$$E(x^*) - C = \sum_{p,q \in N_1} E_{p,q}(x_p^*, x_q^*) \leq \sum_{p,q \in N_1} \hat{E}_{p,q}(x_p^*, x_q^*) \quad (19)$$

$$= \hat{E}(x^*) - \sum_{p,q \in N_0} \hat{E}_{p,q}(0,0) \leq \hat{E}(0) - \sum_{p,q \in N_0} \hat{E}_{p,q}(0,0) \quad (20)$$

$$= \sum_{p,q \in N_1} \hat{E}_{p,q}(0,0) \leq \sum_{p,q \in N_1} E_{p,q}(0,0) \quad (21)$$

Therefore, the energy of the proposed $\alpha$-expansion move may be constructed as:

$$E(x^*) \leq C + \Sigma_{p,q \in N_1} E_{p,q}(0,0) = E(0) \quad (22)$$

Therefore, the energy does not increase, and the expansion move algorithm with truncation ($\hat{E}$) is a valid energy minimization technique for arbitrary functions, which is guaranteed to converge. However, each step is no longer guaranteed to find an optimal $\alpha$-expansion move, and the output does not necessarily have the property of a strong local minimum.

Although the truncated energy $\hat{E}$ algorithm may be applied to any energy function, its application may be limited to some cases. For example, the truncated energy may be applied when the pairwise terms V are expansion-regular.

The truncation procedure may be applied in one example, in the following manner. If the energy term $E_{p,q}$ of the binary labels does not satisfy inequality $E_{p,q}(0,0)+E_{p,q}(1,1) \leq E_{p,q}(0,1)+E_{p,q}(1,0)$ noted in equation (16) above, then one of the following three operations may be performed: decrease $E_{p,q}(0,0)$, increase $E_{p,q}(0,1)$, or increase $E_{p,q}(1,0)$ until an equality is obtained for $\hat{E}_{p,q}$. Note that the fourth term ($E_{p,q}(1,1)$) may not be modified since to make $E_{p,q}$ regular, $E_{p,q}(1,1)$ may be decreased, but then $E(x^*)$ would be greater than $E(0)$, thus, exceeding the bounds of the truncation.

In an additional or alternative method, the semi-metric terms may be truncated with any suitable method, such as replacing non-metric pairwise terms V with Potts terms as described by Boykov, et al. This approach has certain approximation bound guarantees. However, very little information about the structure of the pairwise constraint V is used.

Applying Expansion Move Algorithm to Tapestry Energy Function

The expanded expansion move algorithm may be applied to the energy equation of the tapestry, such as equation (1) above. For example, the region uniqueness constraint, if included in equation (1), may belong to the class of hard constraints discussed with respect to equation (18) above. Moreover, the region uniqueness constraint can be implemented despite the fact that the neighborhood system is the complete graph. Indeed, for each α-expansion, the region uniqueness constraint yields term $E_{p,q}$ for regions p,q∈P only if $b(p,f_p)=b(q,\alpha)$ or $b(p,\alpha)=b(q,f_q)$. In this manner, the number of such terms is at most |P|. Therefore, the number of edges that are needed to be added to the graph constructed for minimizing E is at most linear in the number of tapestry blocks.

As noted above, all label variables $f_p$ are assumed to have the same range L. The tapestry framework may be extended to handle image-shift and cluster labels $f_i$ and $f_c$ described above whose ranges are S and I, respectively. For these variables, the meaning of an α-expansion move may be defined. For example, the image-shift variable $f_i$ may be considered as follows: if α=(i,s) then the label f[x] may be set as:

$$f[x]_i = f_i \text{ if } x_i=0 \text{ and} \quad (23)$$

$$f[x]_i = s \text{ if } x_i=1 \quad (24)$$

where variables $f_j$ for j∈I−{i} do not change during this expansion step and where I is the identify function. In this manner, the energy E for an α-expansion move is regular assuming that the hard constraint terms $H_{p,i}$ satisfy $H_{p,i}((i,s),s)=0$ for all α=(i,s).

The expansion move algorithm may be initialized in any suitable manner, such as with the single image that is most salient, a mosaic of images for larger tapestries, and the like. This initialization may satisfy all hard constraints and have in general a lower energy than a random collection of the most salient blocks. The energy function may contain a plurality of different local minima. For example, a small change in the energy may cause the tapestry framework to converge on a different solution—such as shown in the tapestry images of FIG. 19 having an energy of 40.32 and FIG. 8 having an energy of 40.41.

The optimization performed by the tapestry framework may depend on the order of expansion moves (see for example FIG. 8 and FIG. 19), where for identical input data a different result was attained.

In some cases, such as the expansion move algorithm discussed by Boykov et al, the expansion move algorithm may perform the move in no particular order, e.g. random. However, an expansion order scheme may be introduced and denoted as "parallel expansion," which may lead to an improved performance. For example, a fixed number of expansion moves, larger than the number of all labels, may be selected. The rough region layout may be decided in the first one or more expansion moves. Therefore, K (for example K=5) parallel processes may be run (for a subset of labels in a random order). After R iterations, the tapestry framework may determine which process gives the lowest energy. This process may then run again over all labels. The iterations R may be chosen so that the maximum number of moves is not exceeded.

Figure 18:
FIG. 18 is an example tapestry with weak coherence based on the input images of FIG. 2.
Figure 19:
FIG. 19 is an example tapestry image with medium coherence based on the input images of FIG. 2.
Figure 20:
FIG. 20 is an example tapestry image with strong coherence based on the input images of FIG. 2.
Figure 21:
FIG. 21 is an example tapestry image with very strong coherence based on the input images of FIG. 2.
Figure 22:
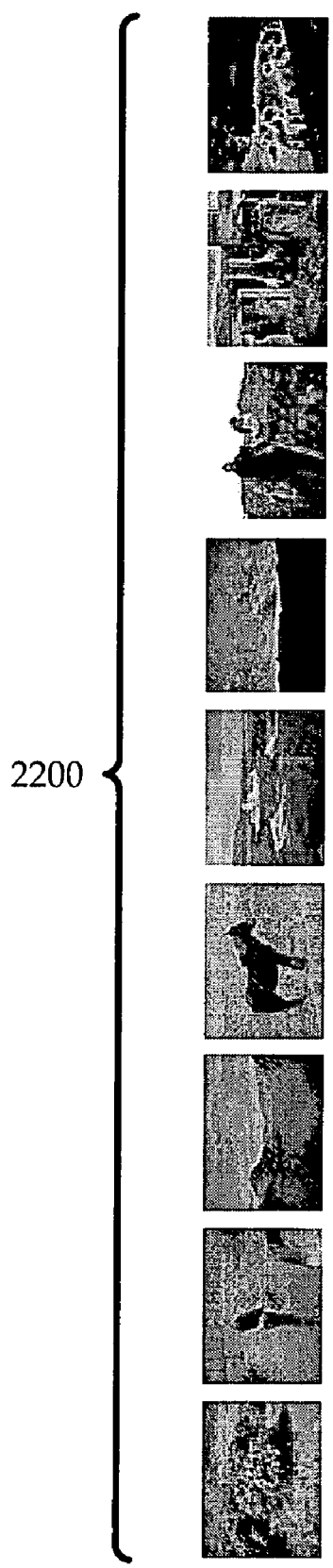
FIG. 22 is an example collection of input images.
Figure 23:
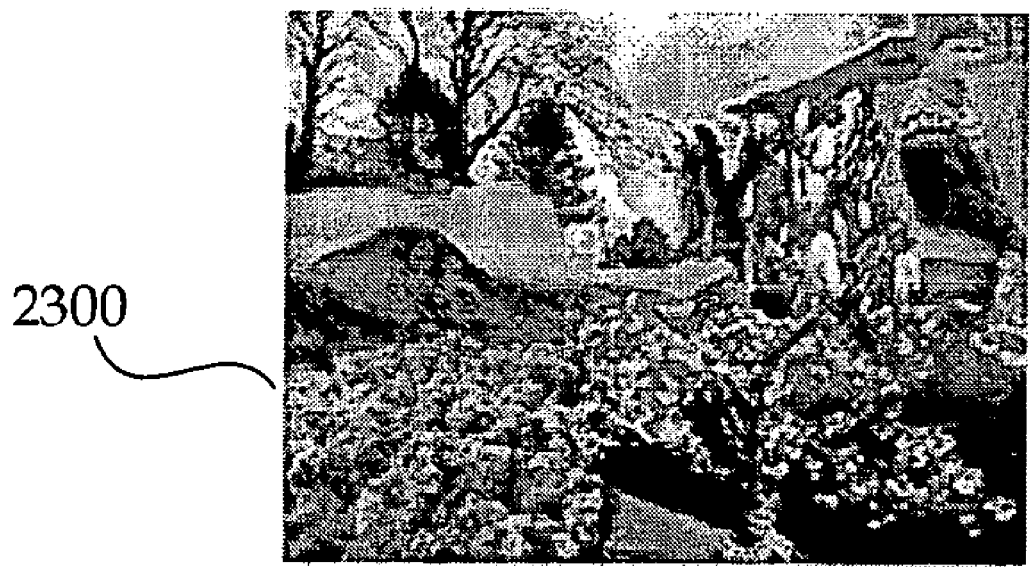
FIG. 23 is an example tapestry image based on the input images of FIG. 22.
Figure 24:
FIG. 24 is an example tapestry image based on the input images of FIG. 22.
Figure 25:
FIG. 25 is an example tapestry image based on the input images of FIG. 22.

Various example tapestry images are shown in FIGS. 18-21, and 23-25. The example tapestry images are based on input image collections containing on average 40 images. For example, FIGS. 18-21 are based on the input image set of FIG. 2; however, each digital tapestry of FIGS. 18-21 results from a different strength of the block coherence constraint (i.e., parameter $\lambda_1$ of equation (4)). As noted above, the block coherence constraint affects the number of different labels (e.g., number of represented image parts) which appear in the tapestry. For example, FIG. 18 illustrates a tapestry 1800 with weak coherence, e.g., 22 labels. In some cases, a weak coherence may cause the resulting tapestry to appear 'overloaded.' FIG. 19 illustrates a tapestry 1900 with medium coherence, e.g., 9 labels. FIG. 20 illustrates a tapestry 2000 with strong coherence, e.g., 3 labels. If the coherence constraint of the MRF is very strong, the expansion move algorithm returns the initial configuration—e.g., the most salient image. FIG. 21 illustrates a tapestry 2100 with very strong coherence, e.g., 1 label, which is identical to the input image 202 of FIG. 2. In another example, the example tapestry images of FIGS. 23-25 are each based on the same input image collection, a sample of which is illustrated in the input image set 2200 of FIG. 22.

In the example tapestry images of FIGS. 8, 17-21, and 23-25, the image tapestry size is the same as the input image size, due to limited space. However, it is to be appreciated that the image tapestry may have any suitable size and/or number of regions/pixels as appropriate. For example, a tapestry image may be increased to accommodate one or more regions or clusters from more input images (e.g., allow the saliency of included image regions/clusters to be decreased.

Tapestry Use

Figure 26:
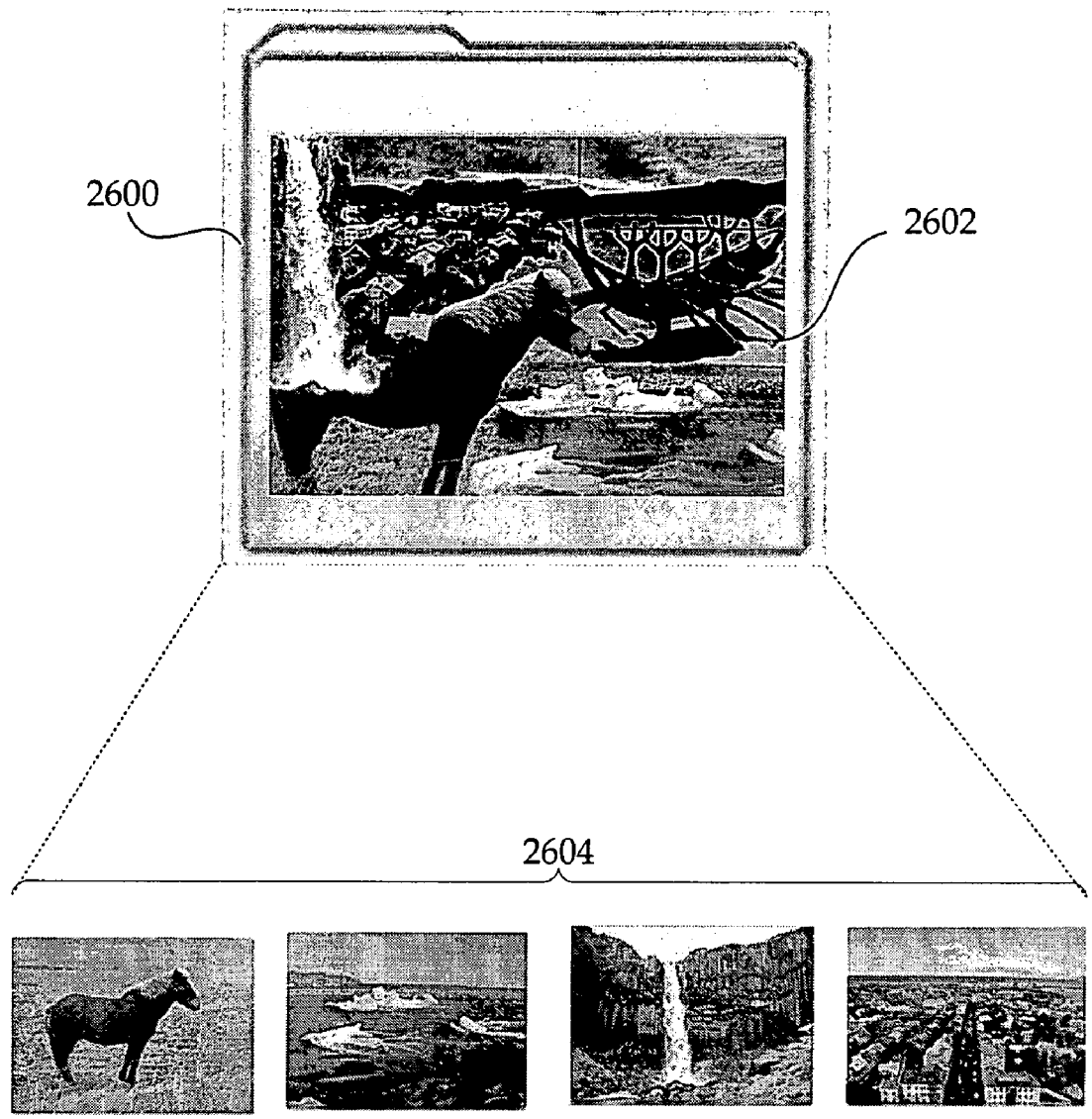
FIG. 26 is an example tapestry image for a data store.

The resulting image tapestry may be used in any suitable manner. For example, a user may direct an application implementing the tapestry system of FIG. 6 may be manually directed by a user to create a tapestry from one or more input images selected by the user. In another example, the tapestry system may be used to automatically create an image tapestry. For example, if one or more images are stored in a data store, the operating system or other data management system may automatically create a tapestry based on the images in the data store. The resulting tapestry may be displayed with an icon or other selection or display indicator of the data store to indicate to the user which pictures are included in the data store. For example, if one or more input images are stored in a folder on a user's desktop, the folder may include a 'thumbprint' tapestry image based on the images stored within the folder. An example folder 2600 is illustrated in FIG. 26, where the tapestry 2602 is based upon the set of images 2604 in the folder 2600.

Figure 28:
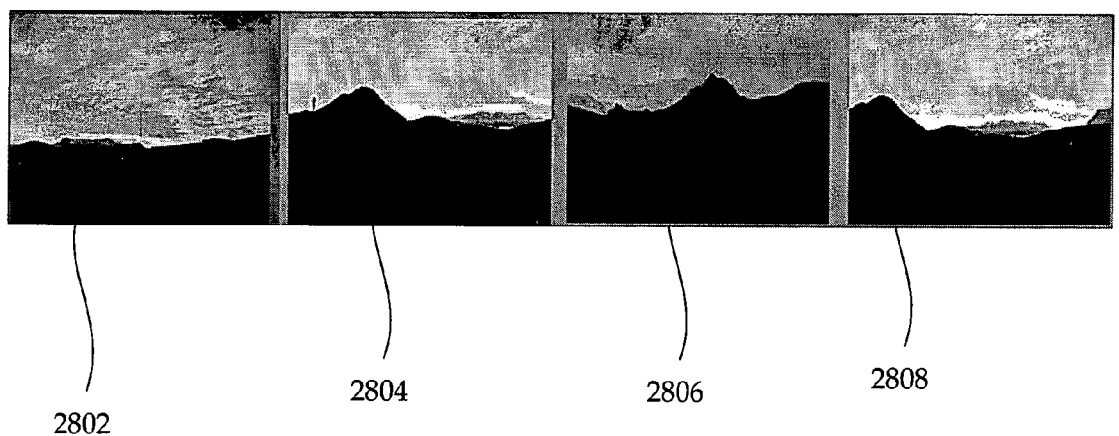
FIG. 28 is an example collection of output images based on a selected region of the tapestry of FIG. 27.

In some cases, the tapestry image may provide an active interface for a user. For example, user selection of an image region in the tapestry may retrieve the input image providing the selected image region. In and additional or alternative example, user selection of an image region in the tapestry may retrieve one or more input images having an image characteristic (e.g., color, texture, contrast, object identification, and the like) similar to the selected image region. For example, the selection of the region 2702 of tapestry 2700 may return one or more of the images 2802, 2804, 2806, 2808 illustrated in FIG. 28. The returned images may be selected from the input images to the tapestry, images within a particular data store or data store segment (e.g., folder), from all available images accessible by the user application, and the like. For example, selection of the region 2704 depicting a horse in the tapestry

Figure 27:
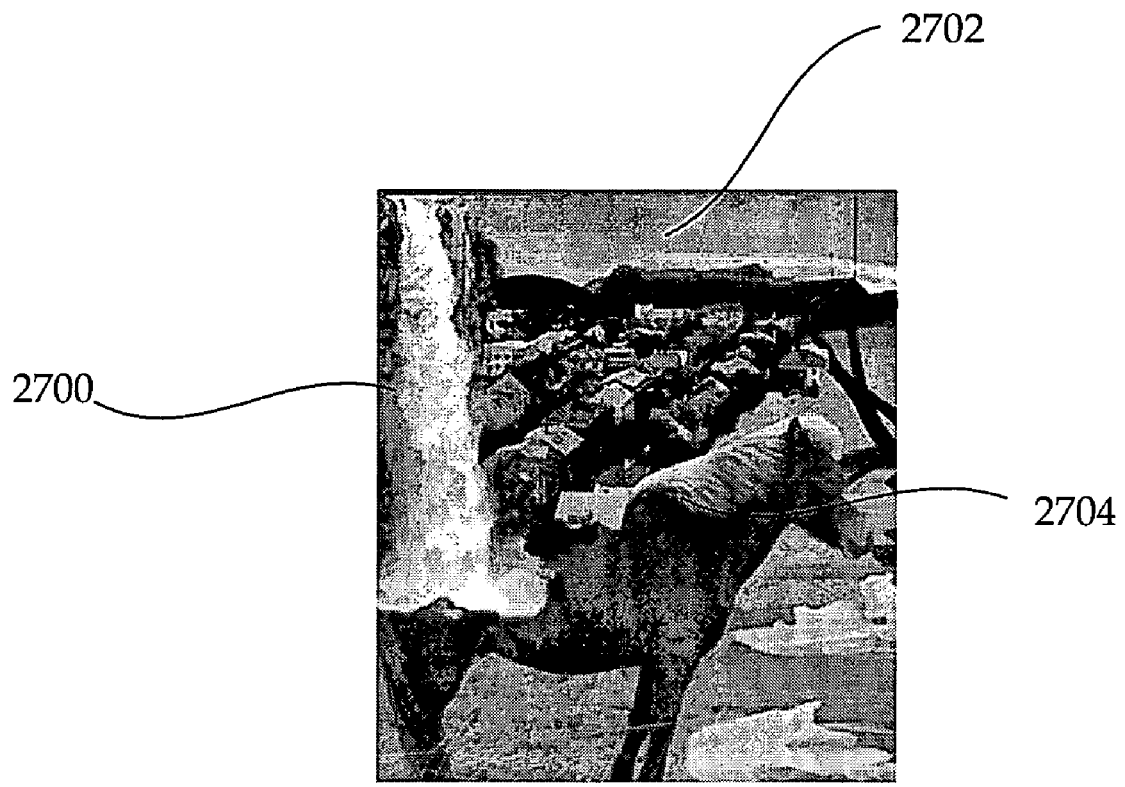
FIG. 27 is an example active interface tapestry.
Figure 29:
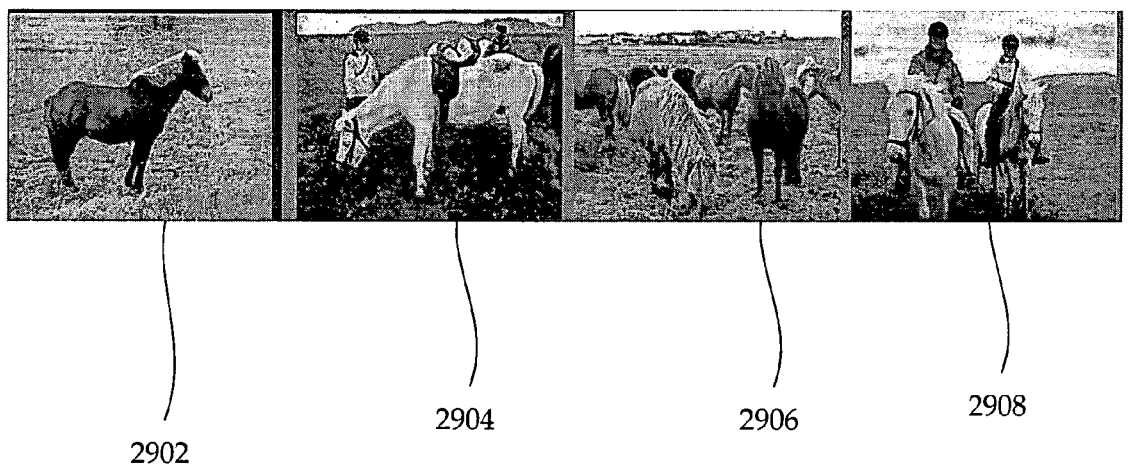
FIG. 29 is an example collection of output images based on a selected region of the tapestry of FIG. 27.

2700 of FIG. 27 may return one or more images 2902, 2904, 2906, 2908 shown in FIG. 29, each also depicting a horse. The returned images may be based upon similar image characteristics, meta-data indicating a correspondence between the selected region and the image, object labels (e.g., horse), and the like. In one example, the input image providing the input region to the tapestry image may be returned alone or indicated in any suitable manner as the input image corresponding to the selected region of the tapestry image. For example, the selected region 2702 of FIG. 27 corresponds to input image 2802 of FIG. 28. The returned images may indicate the portion of the returned image which has the similar image characteristic as the selection tapestry region. For example, the returned input image may have a region indicated with a frame of the region having a similar characteristic.

In an additional and/or alternative example, the user may select one or more regions in one or more tapestry images. In this manner, one or more images may be returned which contain a region which has an image characteristic to at least one or all of the selected image regions. More particularly, the returned image may include an image characteristic of at least one of the selected image regions (e.g., intersection of selected image regions) or may include an image characteristic of all selected image regions (e.g., union of selected image regions).

It is to be appreciated that the user may select an image region i the tapestry in any suitable manner. For example, the user may 'point-and-click' a region of the tapestry, may 'point-and-drag' a frame around a selected region of the tapestry, may 'draw' a frame around the selected region, and the like.

While examples of the input image collections, image tapestry framework, and resulting image tapestries have been illustrated and described, it will be appreciated that various changes can be made therein without departing from the spirit and scope of the invention. For example, the tapestry framework may be modified to exploit further high-level knowledge such as reliable un-supervised texture clustering, face clustering, and automatic image scale detection. In addition, user studies may be conducted to compare tapestries of representative images to improve saliency measurement from a psychological experiment.

The invention claimed is:

1. A method comprising:
   a) receiving at least one input image;
   b) identifying at least two input image regions of the at least one input image, each input image region including a portion of the at least one input image;
   c) determining an objective function including a quality of each of the at least two input image regions;
   d) optimizing the objective function with respect to a tapestry image containing the at least two input image regions based on the optimizing;
   e) storing the optimized tapestry image in a data store of a computing device; and
   f) displaying an output image comprising the optimized tapestry image on a display of the computing device.

2. The method of claim 1, wherein the objective function includes a measure of spatial coherence in the tapestry image based on a likelihood of placement of one or more neighboring input image regions as tapestry neighboring regions in the tapestry image.

3. The method of claim 1, wherein the objective function includes a measure of region uniqueness for reducing redundant input image regions in the tapestry image.

4. The method of claim 1, wherein the objective function includes a measure of localization of placement of an input image region in the tapestry image based on a preference for placing a depicted scene in the input image region at a predetermined area of the tapestry image.

5. The method of claim 1, wherein the objective function includes a measure of appearance coherence for placing a first input image region next to a second input image region based on an image characteristic of both the first input image region and the second input image region.

6. The method of claim 1, wherein the objective function includes a measure of image-shift uniqueness for preventing the placement of two input image regions in the tapestry which are from the same input image and have an identical shift.

7. The method of claim 1, wherein the objective function includes a measure of a detected object within an input image region.

8. The method of claim 1, wherein the objective function includes a measure of an image characteristic class uniqueness of an input image region for reducing a plurality of input image regions from different input images and having similar image characteristics.

9. The method of claim 1, wherein forming the objective function includes using a Markov random field.

10. The method of claim 1, wherein optimizing includes using a graph cut based expansion move algorithm.

11. The method of claim 10, wherein the objective function includes at least one non-metric hard term.

12. The method of claim 10, wherein the objective function includes at least one non-metric soft term.

13. A method comprising:
   a) receiving at least two unregistered input images;
   b) identifying at least two input image regions of the at least two unregistered input images, each input image region including a portion of one of the at least two input images;
   c) determining an objective function for evaluating a quality of each of the at least two input image regions;
   d) optimizing the objective function with respect to a tapestry image containing the at least two input image regions based on the optimizing;
   e) storing the optimized tapestry image in a data store of a computing device; and
   f) displaying an output image comprising the optimized tapestry image on a display of the computing device.

14. The method of claim 13, wherein the objective function includes a measure of region coherence for forming a cluster of two or more input image regions from a single input image for placement in the tapestry image and includes a measure of region uniqueness for reducing redundant input image regions in the tapestry image.

15. The method of claim 13, wherein the objective function includes one of a group comprising a measure of localization of placement of an input image region in the tapestry image based on a preference for placing a depicted scene in the input image region at a predetermined area of the tapestry image, a measure of appearance coherence for placing a first input image region next to a second input image region based on an image characteristic of both the first input image region and the second input image region, a measure of image-shift uniqueness for placing a first input image region from a first input image and a second input image region from the first input image with an identical image shift in the tapestry image, a measure of a detected object within an input image region, a measure of an image characteristic class uniqueness of an input image region for reducing a plurality of input image regions from different input images and having similar image characteristics.

16. The method of claim 15, wherein optimizing includes using a graph cut based expansion move algorithm, and the objective functions includes a non-metric hard term and/or a non-metric soft term.

17. One or more computer readable storage media having computer executable instructions for performing steps comprising:
   a) receiving a plurality of input images;
   b) dividing each input image of the plurality of input images into a plurality of regions;
   c) selecting at least two salient regions from the plurality of regions;
   d) applying a region coherence constraint to at least one of the at least two salient regions to cluster a plurality of salient image regions from a single input image;
   e) applying a region uniqueness constraint to the at least two salient regions to reduce duplication of an input image region; and
   f) optimizing a tapestry image containing the at least two salient regions based on the application of the region coherence constraint and the region uniqueness constraint.

18. The computer readable storage media of claim 17, wherein applying the region coherence constraint includes using a Markov random field to create a cluster of two or more regions for placement together in the tapestry image.

19. The computer readable storage media of claim 18, further comprising applying an additional constraint, the additional constraint being member of a group consisting essentially of a localization constraint on placement of at least one salient region based on a color of the at least one salient region; an appearance dependent Markov random field to the at least two salient regions to place the at least two salient regions in the tapestry image; an image-shift uniqueness constraint to place the at least two salient regions in the tapestry image; a detected object constraint for detecting an object depicted in at least one of the salient regions and in an adjacent region of an input image to form the tapestry image; and a class uniqueness constraint on the at least two salient regions to form the tapestry image.

20. The computer readable storage media of claim 19, wherein optimizing the tapestry image includes using a graph cut algorithm.

21. One or more computer readable storage media having computer executable instructions causing a computer to perform the method of claim 1.

22. One or more computer readable storage media having computer executable instructions causing a computer to perform the method of claim 13.

* * * * *